(12) United States Patent
Chiashi

(10) Patent No.: US 8,280,411 B2
(45) Date of Patent: Oct. 2, 2012

(54) COMMUNICATION TERMINAL DEVICE AND CONTROL PROGRAM THEREOF

(75) Inventor: Eiji Chiashi, Akiruno (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 423 days.

(21) Appl. No.: 12/552,713

(22) Filed: Sep. 2, 2009

(65) Prior Publication Data

US 2010/0081418 A1 Apr. 1, 2010

(30) Foreign Application Priority Data

Sep. 30, 2008 (JP) ................................. 2008-253803

(51) Int. Cl.
*H04W 24/00* (2009.01)

(52) U.S. Cl. .................. 455/456.4; 455/565; 455/456.1; 455/550.1; 455/569.1

(58) Field of Classification Search ............... 455/404.2, 455/412.1, 412.2, 418, 456.1, 565, 569.1, 455/575.3, 575.4
See application file for complete search history.

(56) References Cited

U.S. PATENT DOCUMENTS

| | | | | |
|---|---|---|---|---|
| 7,120,475 B2* | 10/2006 | Kaneko | ...................... | 455/575.1 |
| 7,469,155 B2 | 12/2008 | Chu | | |
| 2002/0019216 A1* | 2/2002 | Horiguchi | ...................... | 455/90 |
| 2003/0162560 A1* | 8/2003 | Kaneko | .......................... | 455/550 |
| 2004/0235539 A1* | 11/2004 | Ohta | .......................... | 455/575.3 |
| 2005/0261024 A1* | 11/2005 | Jin | .................................. | 455/557 |
| 2006/0035677 A1* | 2/2006 | Aerrabotu et al. | ............. | 455/565 |
| 2006/0099996 A1* | 5/2006 | Kanai | ............................ | 455/566 |
| 2006/0116175 A1* | 6/2006 | Chu | ................................ | 455/567 |
| 2006/0160523 A1* | 7/2006 | Erskine et al. | ................. | 455/405 |
| 2009/0197584 A1* | 8/2009 | Snow et al. | ................... | 455/418 |

FOREIGN PATENT DOCUMENTS

| | | |
|---|---|---|
| CN | 1770781 | 5/2006 |
| CN | 101076949 | 11/2007 |
| JP | 2001-069574 | 3/2001 |
| JP | 2003-060746 | 2/2003 |
| JP | 2003-284153 | 10/2003 |
| JP | 2005-303443 | 10/2005 |
| JP | 2007-150939 | 6/2007 |
| JP | 2007-189394 | 7/2007 |
| KR | 0150740 | 5/1997 |
| KR | 2006-39229 | 5/2006 |
| WO | WO 2006/057770 | 6/2006 |

* cited by examiner

*Primary Examiner* — Jinsong Hu
*Assistant Examiner* — Magdi Elhag
(74) *Attorney, Agent, or Firm* — Cozen O'Connor

(57) ABSTRACT

In a mobile phone (1) that is changeable to a plurality of styles, when connecting a call in response to an originating call or an incoming call by a wireless communication section (14), a central control section (11) controls a style detecting section (24) to detect a current style, and judges whether or not the call should be restricted by referring to an operation mode information storage section (M5). The central control section (11) then restricts the call based on this restriction judgment result and the detection result from the style detecting section (24). Also, the central control section 11 drives a notifying section (20) to give a notification indicating that a call in a certain style is restricted.

11 Claims, 17 Drawing Sheets

<CLOSE STYLE>

<OPEN STYLE>

<VIEW STYLE>

FIG. 4

OPERATION MODE INFORMATION  M5

| OPERATION MODE ID | OPERATION MODE NAME | SETTING FLAG |
|---|---|---|
| M01 | JAPAN MODE | 0 |
| M02 | OVERSEAS MODE | 1 |
| ... | ... | ... |

CONDITION INFORMATION

| CONDITION ID | CONDITION NAME | SETTING FLAG |
|---|---|---|
| C01 | OPERATION MODE | 0 |
| C02 | COUNTRY/REGION IDENTIFYING INFORMATION | 1 |
| C03 | LOCATION INFORAMTION | 0 |
| ... | ... | ... |

FIG. 14

CALL RESTRICTION INFORMATION M7

| STYLE ID | STYLE | OPERATION MODE | COUNTRY/REGION IDENTIFYING INFORMATION | LOCATION INFORMATION |
|---|---|---|---|---|
| S01 | CLOSE STYLE | OVERSEAS MODE | **** | **** |
| S02 | OPEN STYLE | — | — | — |
| S03 | VIEW STYLE | OVERSEAS MODE | **** | **** |
| ⋮ | ⋮ | ⋮ | ⋮ | ⋮ |

COMMUNICATION TERMINAL DEVICE AND CONTROL PROGRAM THEREOF

CROSS-REFERENCE TO RELATED APPLICATION

This application is based upon and claims the benefit of priority from the prior Japanese Patent Application No. 2008-253803, filed Sep. 30, 2008, the entire contents of which is incorporated herein by reference.

BACKGROUND OF THE INVENTION

1. Field of the Invention

The present invention relates to a communication terminal device having at least one housing with a structure that is changeable to a plurality of styles, and a control program thereof.

2. Description of the Related Art

In general, some of communication terminal devices such as mobile phones are usable in a plurality of regions (divided into arbitrary areas, such as continent, country, state, and prefecture). Among such communication terminal devices, some include a plurality of operation modes such as "Japan mode" for use in Japan and "overseas mode" for use in overseas, and the switching operation of these modes are performable. These modes are used, for example, for switching communication systems in accordance with a communication system of the region the communication terminal device is being used, and switching languages displayed in a display section. (refer to, for example, Japanese Patent Application Laid-Open (Kokai) Publication No. 2007-189394)

In addition, communication terminal devices of various housing structures, such as a folding-type and a sliding-type, are known. In a communication terminal device such as these, a usage state (style) is changeable to various usage states according to its housing structure, and it is possible to make or receive a call in each of the usage states.

Furthermore, in some regions, in view of protecting the health of communication terminal users, the distance between the antenna and the reception speaker during a call is restricted so that the antenna generating electromagnetic waves does not come close to the ear (brain).

However, in a case where a communication terminal device that is usable in a plurality of regions is used at a travel destination or during a business trip, it is complicated and difficult for the user to research details of regulations implemented in the region (a standard value of the distance between the antenna and the reception speaker, etc.), and make or receive calls using only a style complying with the regulations.

In addition, if a company manufacturing and selling such communication terminal devices adopts a system in which a style not meeting the regulations is used for calls, they will have a problem, that is, they will be unable to sell the devices in that region.

On the other hand, if calls in a certain style are uniformly restricted (prohibited) in compliance with the strictest regulations in the world instead of allowing the user to decide the style used for calls, the number of usable styles for calls decreases (in other words, calls will not be made or received in most styles depending on circumstances), and the usability diminishes significantly.

SUMMARY OF THE INVENTION

The present invention has been conceived to solve the above-described problems, and is to appropriately control whether or not to restrict a call in a certain style in a communication terminal device that is changeable to a plurality of styles.

In order to achieve the above-described purpose, in accordance with one aspect of the present invention, there is provided a communication terminal device having at least one housing with a structure that is changeable to a plurality of styles, comprising: a communication detection means for detecting communication that is at least one of either an incoming call or an originating call; a call connection means for connecting a call in response to communication detected by the communication detection means; a style detection means for detecting a current style; a restriction judgment means for judging whether or not a call in a certain style should be restricted; and a control means for performing control such that a call connected in response to communication detected by the communication detection means is restricted based on a detection result from the style detection means and a judgment result from the restriction judgment means.

In accordance with another aspect of the present invention, there is provided a communication terminal device having at least one housing with a structure that is changeable to a plurality of styles, comprising: a communication detection means for detecting communication that is at least one of either an incoming call or an originating call; a call connection means for connecting a call in response to communication detected by the communication detection means; a style detection means for detecting a current style; a restriction judgment means for judging whether or not a call in a certain style should be restricted; and a restriction notification means for giving at least one of either a notification indicating that a call connected in response to communication detected by the communication detection means is restricted or a notification prompting change of the certain style to another style, based on a detection result from the style detection means and a judgment result from the restriction judgment means.

In accordance with another aspect of the present invention, there is provided a computer-readable storage medium having stored thereon a program that is executable by a computer, comprising: communication detection process for detecting communication that is at least one of either an incoming call or an originating call; call connection process for connecting a call in response to detected communication; style detection process for detecting a current style; restriction judgment process for judging whether or not a call in a certain style should be restricted; and control process for performing control such that a call connected in response to detected communication is restricted based on a style detection result and a restriction judgment result.

In accordance with another aspect of the present invention, there is provided a computer-readable storage medium having stored thereon a program that is executable by a computer, comprising: communication detection process for detecting communication that is at least one of either an incoming call or an originating call; call connection process for connecting a call in response to detected communication; style detection process for detecting a current style; restriction judgment process for judging whether or not a call in a certain style should be restricted; and control process for giving at least one of either a notification indicating that a call connected in response to detected communication is restricted or a notification prompting change of the certain style to another style, based on a style detection result and a restriction judgment result.

According to the present invention, whether or not to restrict a call in a certain style is appropriately controlled.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4 is a diagram explaining an operation mode information storage section M5;

FIG. 14 is a diagram explaining a call restriction information storage section M7 according to the third embodiment;

DETAILED DESCRIPTION OF THE PREFERRED EMBODIMENTS

The present invention will hereinafter be described in detail with reference to the preferred embodiments shown in the accompanying drawings.

First Embodiment

First, a first embodiment of the present invention will be described with reference to FIG. 1 to FIG. 9.

Figure 1:
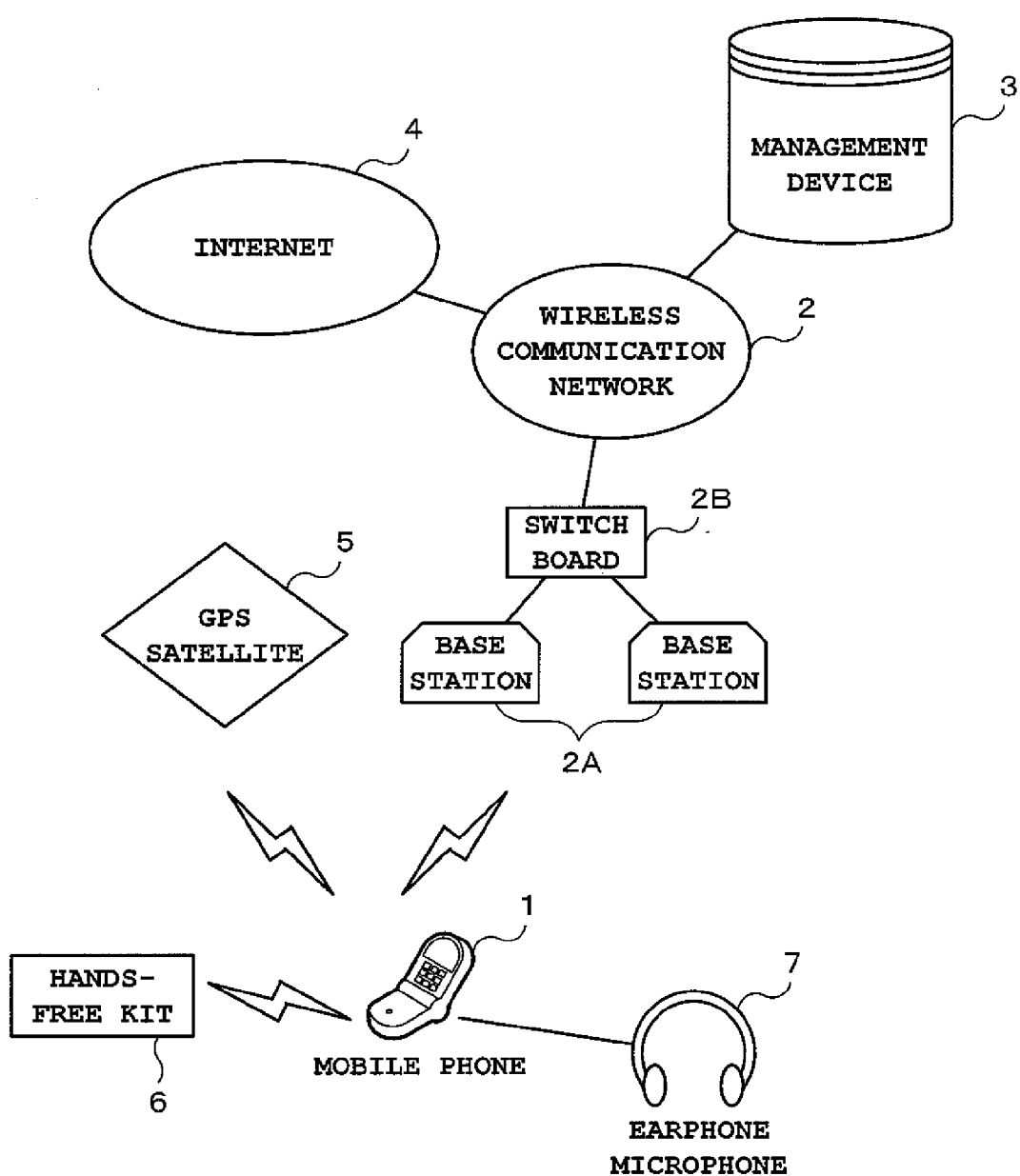
FIG. 1 is a block diagram showing a communication network system of a mobile phone serving as a communication terminal device.

The first embodiment is an example of the present invention applied to a mobile phone serving as a communication terminal device. FIG. 1 is a block diagram showing a communication network system of the mobile phone.

A mobile phone 1 is a two-shaft hinge-type phone that is changeable to a plurality of styles (housing usage patterns) based on the connecting state of a plurality of housings constituting the main body of the device (apparatus body), and provides a call function, an electronic mail function, an Internet connection function (web access function), etc. When the mobile phone 1 is connected to a management device 3 on a telecommunication carrier side via a nearest base station 2A, a switchboard 2B, and a wireless communication network 2, a call between the mobile phone 1 and another mobile phone 1 is possible via the wireless communication network 2. The management device 3 transmits country and region identifying information to the mobile phone 1 in addition to managing the wireless communication network 2.

When the mobile phone 1 is connected to the Internet 4 via the wireless communication network 2, the transmission and reception of electronic mail, access to web sites, and downloading of contents such as music and movies are possible. In addition, the mobile phone 1 receives and acquires, for example, global positioning system (GPS) information (positional information) from a GPS satellite 5. Furthermore, the mobile phone 1 is connectable to external audio output devices such as a hands-free kit 6 that enables communication using a reception speaker and a microphone, and an earphone microphone 7 that enables communication using an earphone and a microphone.

Figure 2:
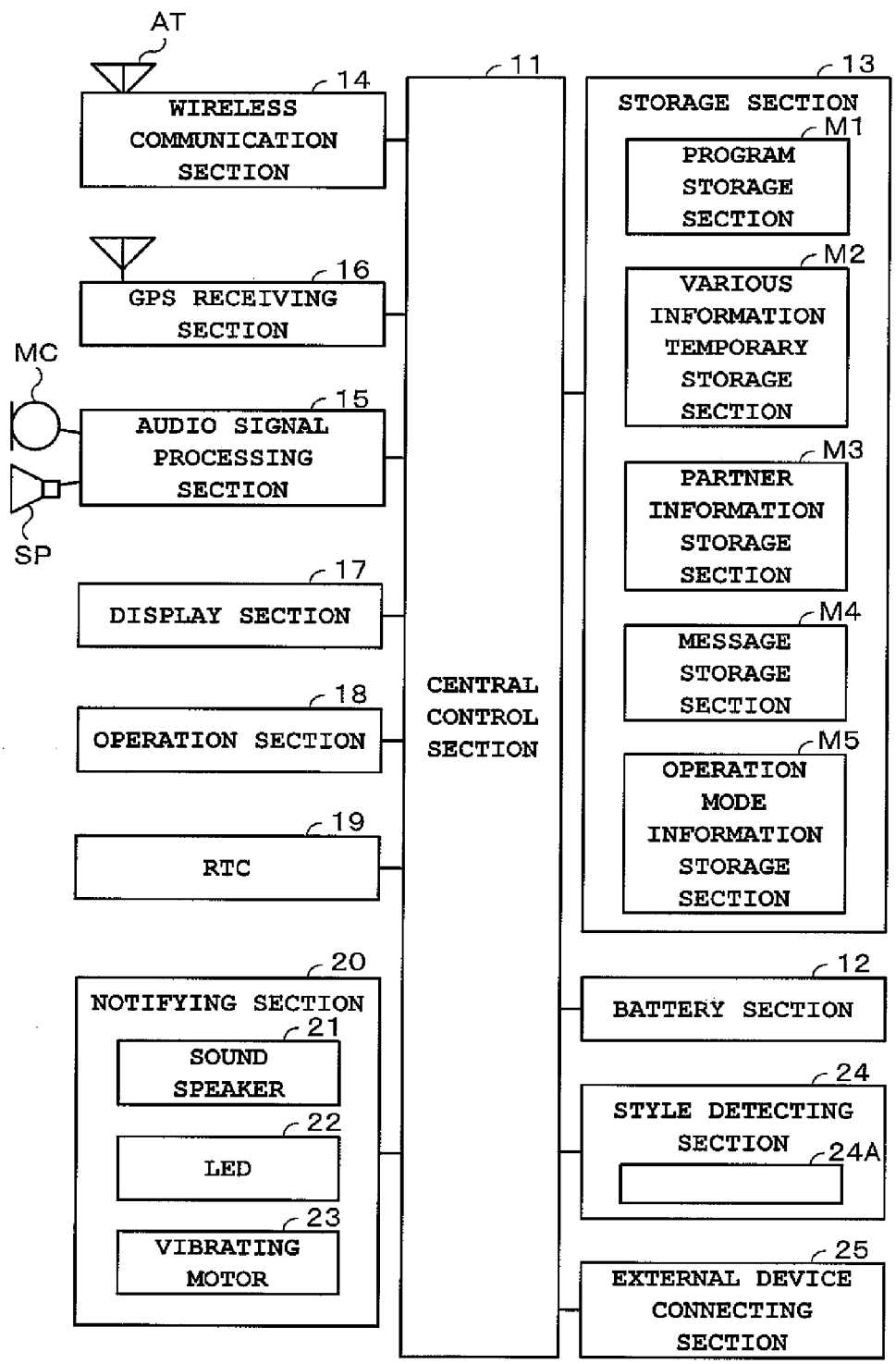
FIG. 2 is a block diagram showing basic components of a mobile phone 1.

FIG. 2 is a block diagram showing basic components of the mobile phone 1.

In FIG. 2, a central control section 11 includes a central processing unit, memory, etc., and operates using power supplied from a battery section 12 including a secondary battery. The central processing unit controls the overall operations of the mobile phone 1 based on various programs stored in a storage section 13. The storage section 13 includes a program storage section M1, a various information temporary storage section M2, a partner information storage section M3, a message storage section M4, an operation mode information storage section M5, etc. The program storage section M1 stores therein programs, various applications, and the like actualizing the embodiment based on operation procedures shown in FIG. 7 and FIG. 8, as well as various information required for the programs and applications.

The various information temporary storage section M2 is a work area that temporarily stores therein various information required for the operation of the mobile phone 1, such as flag information, timer information, and screen information to be displayed in the display section. The partner information storage section 3 stores therein information related to communication partners such as names, telephone numbers, electronic mail addresses, etc. which constitute an address book. The message storage section M4 records a message from a partner during a call, and the content of a recorded message is playable whenever necessary. The operation mode information storage section M5 will be described in detail hereafter.

A wireless communication section 14 includes a baseband section, a demultiplexing section, a wireless section having an antenna AT, etc., and exchanges data with the nearest base station 2A during an operation performed to actualize, for example, the call function, the electronic mail function, or the Internet connection function. When the call function is running, the wireless communication section 14 receives signals from the receiving side of the baseband section, and after demodulating the received baseband signals, outputs the demodulated baseband signals from a reception speaker SP as audio via an audio signal processing section 15. In addition, the wireless communication section 14 receives audio data inputted from a transmission microphone MC from the audio signal processing section 15, and after encoding the audio data into transmission baseband signals, sends the encoded signals to the transmitting side of the baseband section, and transmits the encoded signals from the antenna.

A GPS receiving section 16 (acquisition means) receives and acquires GPS information (positional information) from the GPS satellite 5. The central control section 11, for example, acquires the current location based on this GPS information from the GPS satellite 5 and positional information from the base station 2A. A display section 17 includes a high-definition liquid crystal display, an organic electroluminescent (EL) display, or the like, and displays text information, an image for standby display, etc. An operation section 18 is used to perform dial input, text input, command input, etc., and the central control section 11 performs processing based on input operation signals from this operation section 18. A real time clock module (RTC) 19 constitutes a clock section, and the central control section 11 acquires current time and date from this RTC 19. A notifying section 20 (incoming call notification means and speaker-phone call connection means) include a sound speaker 21, a light-emitting diode (LED) 22, and a vibrating motor 23. When an incoming call is received, the notifying section 20 is driven to signal the incoming call. The notifying section 20 is also driven during alarm notification, etc.

A style detecting section 24 (style detection means) detects a style indicating the usage state of the housings. For example, magnets and magnetic sensors may be arranged in various areas of the housings, and the style detecting section 24 may be configured to detect the style based on a detection result from these magnetic sensors. The central control section 11 identifies the current style based on a detection signal from the style detection section 24. Here, when conducting a call in response to an originating call or an incoming call, the central control section 11 judges whether or not a call in a certain style should be restricted, and based on this restriction judgment result and a detection result from the style detection sensor 24, restricts the call, or notifies the user that the call will be restricted. When this certain style (the current style) is changed to another style, the central control section 11 releases the restriction on the call according to the style change. "Restriction on a call" refers to the prohibition or discontinuation of a call (the same applies to other embodiments described hereafter).

An external device connecting section 25 (connection means) is a common connection terminal such as a universal serial bus (USB) terminal, and an external audio output device such as a hands-free kit 6 or an earphone microphone 7 is connected thereto. Here, when a connection is established in response to an originating call or an incoming call with an external audio output device such as the hands-free kit 6 or the earphone microphone 7 being connected to the external device connecting section, or when a speaker phone call in which audio from a communication partner is outputted from the reception speaker SP at a loud volume is being performed, the central control section 11 performs control such that the call is not restricted.

Figure 3A:
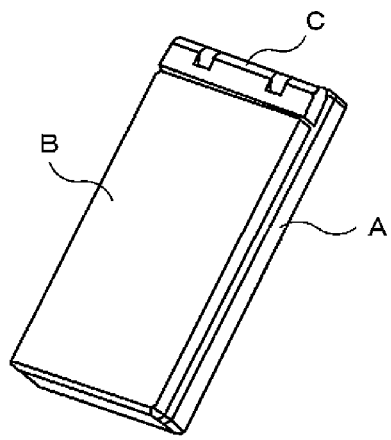
FIG. 3A is an outline view of the mobile phone 1 showing a close style in which an operation section housing A and a display section housing B are in a folded state.
Figure 3B:
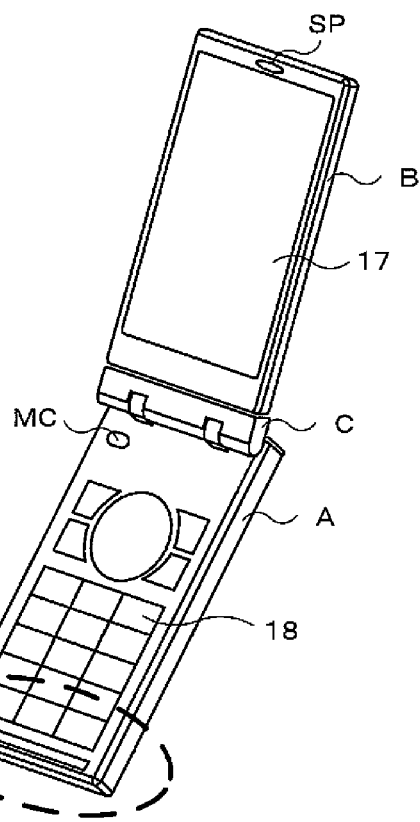
FIG. 3B is an outline view of the mobile phone 1 showing an open style in which the operation section housing A and the display section housing B are in an unfolded state.
Figure 3C:
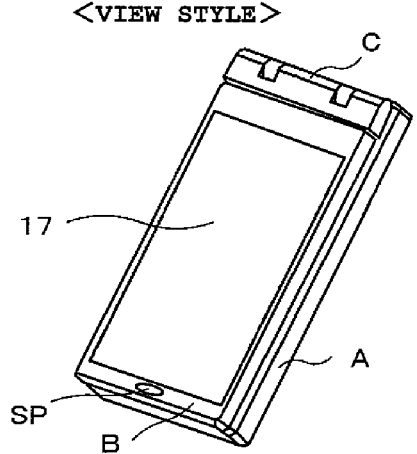
FIG. 3C is an outline view of the mobile phone 1 showing a view style in which the display section housing B is in a state rotated by 180 degrees and folded from the open style.

FIG. 3A, FIG. 3B, and FIG. 3C are all outline views of the mobile phone 1.

As shown in these diagrams, the mobile phone 1 is a two-shaft hinge-type mobile phone device, and an operation section housing A having the operation section 18 and a display section housing B having the display section 17 are foldably and rotatably connected via a hinge section C. The hinge section C includes an opening and closing hinge shaft that enables the operation section housing A and the display section housing B to be folded and unfolded, and a rotation hinge shaft that is positioned roughly perpendicular to this opening and closing hinge shaft which enables one housing to rotate with respect to the other housing. The operation section housing A and the display section housing B are foldably and rotatably connected via this hinge section C.

In a two-shaft hinge-type mobile phone 1 such as this, the shape of the mobile phone is changeable to a plurality of styles (such as a close style, an open style, and a view style) based on how the operation section housing A and the display section housing B are connected. FIG. 3A shows a close style in which the operation section housing A and the display section housing B are in a folded state. FIG. 3B shows an open style in which the operation section housing A and the display section housing B are in an unfolded state.

FIG. 3C shows a view style in which the display section housing B is rotated by 180 degrees from the open style and subsequently folded. In this view style, the display section 17, which faces inward in the close style, faces outward. The operation section 18 and the transmission microphone MC shown in FIG. 2 are positioned on the inner surface side of the operation section housing A, and the display section 17 and the reception speaker SP, also shown in FIG. 2, are positioned on the inner surface side of the display section housing B. Note that the transmission microphone MC is positioned near the hinge section C, and the reception speaker SP is positioned on the opposite side of the hinge section C. An antenna AT, also shown in FIG. 2, is included within an area surrounded by a dashed line in FIG. 3B, namely the opposite side of the hinge C on the inner surface side of the operation section housing A. Therefore, in the close style and the view style, the antenna AT and the reception speaker SP are opposed to each other, and the distance therebetween is small.

FIG. 4 is a diagram explaining the operation mode information storage section M5.

In FIG. 4, the operation mode information storage section M5 stores therein operation mode information corresponding to regions in which the mobile phone 1 is used. An "operation mode ID" field, an "operation mode name" field, and a "setting flag" field are included in this operation mode information storage section M5. The "operation mode ID" is, for example, a serial number identifying operation mode information. The "operation mode name" is a name given to an operation mode, such as "Japan mode" or "overseas mode". The "setting flag" indicates a currently enabled operation mode selectively set by user operation. When a value set in the "setting flag" is "1", the operation mode is currently enabled. In "overseas mode", menus and the like are displayed in English. Also, in a case where a different communication system is being used, the communication system is switched. Note that the "overseas mode" may be a mode corresponding to an arbitrary region, such as "United States mode" or "Europe mode". The central control section 11 refers to information in the operation mode information storage section M5 and judges whether or not to restrict a call in a certain style described above based on an operation mode of which the "setting flag" is "1".

In the first embodiment, the central control section 11 actualizes functions of a communication detection means, a call connection means, a restriction judgment means, a control means, a release means, and a set means.

Next, an operational concept of the mobile phone 1 according to the first embodiment will be described with reference to the flowcharts in FIG. 5 to FIG. 9. Processing in the flowcharts is performed by the central control section 11.

Each function described in the flowcharts is stored in a readable program code format, and operations according to these program codes are successively performed. Operations according to the program codes transmitted from a transmitting medium may also be successively performed. The same applies to other embodiments described hereafter. Operations unique to this embodiment may also be performed using programs and data provided from an external source via a transmitting medium, in addition to a recording medium.

Figure 5:
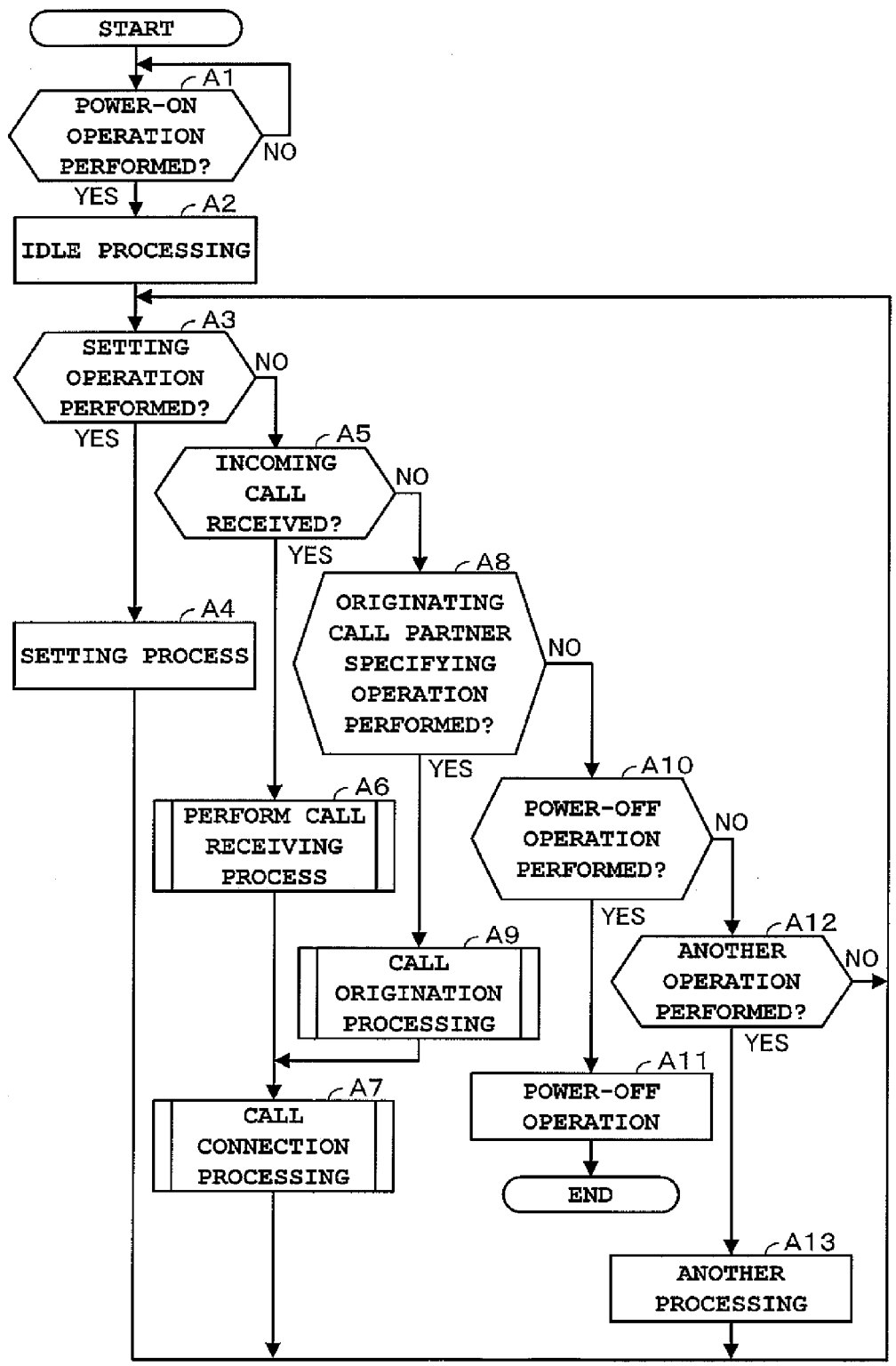
FIG. 5 is a flowchart showing an overview of the overall operations of the mobile phone 1.

FIG. 5 is a flowchart (main routine) showing an overview of the overall operations performed by the mobile phone 1.

In FIG. 5, firstly, when a power-ON operation for turning on the power is performed (YES at Step A1), the central control section 11 performs power-ON processing to start power supply, and initialize a predetermined memory and the like. Then, after performing idle processing for reading and displaying a predetermined wallpaper image, and for registering the location through communication with the base station 2A (Step A2), the central control section 11 remains at Step A3 until a certain operation is detected (Step A3, Step A5, Step A10, and Step A12), or an incoming call is detected by the wireless communication section 14 (Step A5).

Here, when a setting operation is performed (YES at Step A3), the central control section 11 performs setting processing such as turning on or off "setting flag" in the operation mode information storage section M5 (Step A4), and then returns to Step A3. Also, when an incoming call is detected (YES at Step A5), the central control section 11 performs call reception processing (Step A6) and call connection processing (Step A7) described hereafter, and then returns to Step A3. Moreover, when a telephone number of a call partner is entered from the operation section 18, or a call partner specifying operation for selecting a call partner from information in the partner information storage section M3 is performed (YES at Step A8), the central control section 11 performs call origination processing (Step A9) described hereafter and the call connection processing, and then returns to Step A3.

When a power-OFF operation is performed (YES at Step A10), the central control section 11 performs a power-OFF operation (Step A11), and then exits the process flow in FIG. 5. When an operation other than the power-OFF operation is performed (YES at Step A12), the central control section 11 performs processing corresponding to this operation (Step A13), and then returns to Step A3. This processing corresponding to an operation is, for example, mail transmission processing corresponding to a mail transmitting operation, or playback processing for reading and outputting a content in the message storage section M4 corresponding to a playback operation for instructing the playback of a recorded message.

Figure 6:
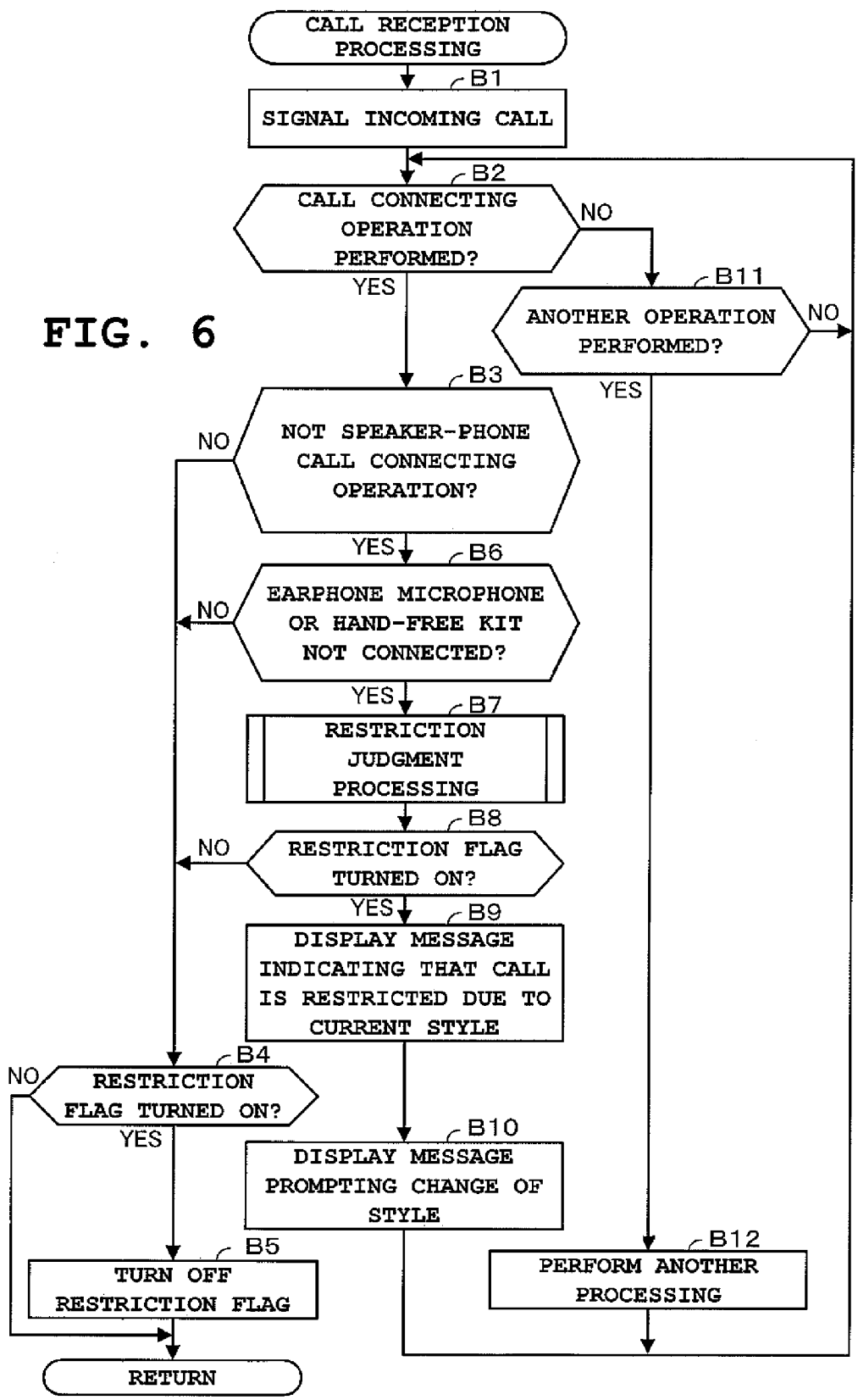
FIG. 6 is a flowchart showing details of call reception processing (Step A6 in FIG. 5)

FIG. 6 is a flowchart showing details of the call reception processing (Step A6 in FIG. 5).

In FIG. 6, firstly, the central control section 11 signals an incoming call by driving the sound speaker 21 and the LED 22 constituting the notifying section 20, by driving the vibration motor 23, or by controlling the display section 17 to display information indicating that an incoming call has been received and information on the partner (Step B1). Then, the central control section 11 judges whether or not a call connecting operation (off-hook operation) for connecting the line (Step B2) or an operation other than the call connecting operation (Step B11) has been performed. When judged that an operation other than the call connecting operation, such as an incoming call volume changing operation, has been performed (YES at Step B11), the central control section 11 performs processing such as incoming call volume change processing corresponding to this operation (Step B12), and then returns to Step B2.

When judged that the call connecting operation has been performed (YES at Step B2), the central control section 11 judges whether or not the call connecting operation is a speaker-phone call connecting operation that instructs the output of audio from a call partner at a loud volume (Step B3). When judged that the call connecting operation is the speaker-phone call connecting operation (NO at Step B3), because the user is considered to communicate with the call partner with the reception speaker SP being placed away from his ear, the central control section 11 proceeds to Step B4 to control not to restrict the call regardless of the current style. At Step B4, the central control section 11 judges whether or not a restriction flag, described hereafter, has been turned on (Step B4). At this point, the restriction flag is turned off (NO at Step B4). Therefore, the central control section 11 exits the process flow in FIG. 6. When judged that the call connecting operation is not the speaker-phone call connecting operation or, in other words, is an operation that instructs a normal call in which the audio from the call partner is outputted at a set volume (YES at Step B3), the central control section 11 judges whether or not the hands-free kit 6 or the earphone microphone 7 has been connected as an external audio output device (Step B6).

When judged that the hands-free kit 6 or the earphone microphone 7 has been connected (NO at Step B6), because the user is considered to communicate with the call partner using the external audio output device and unlikely to place the receiver speaker SP near his ear, the central control section 11 proceeds to Step B4 to control not to restrict the call regardless of the current style. At this point, the restriction flag is turned off (NO at Step B4). Therefore, the central control section 11 exits the process flow in FIG. 6. On the other hand, when judged that the call connecting operation is not the speaker-phone call connecting operation and the external audio output device has not been connected (YES at Step B6), the central control section 11 proceeds to restriction judgment processing (Step B7).

Figure 7:
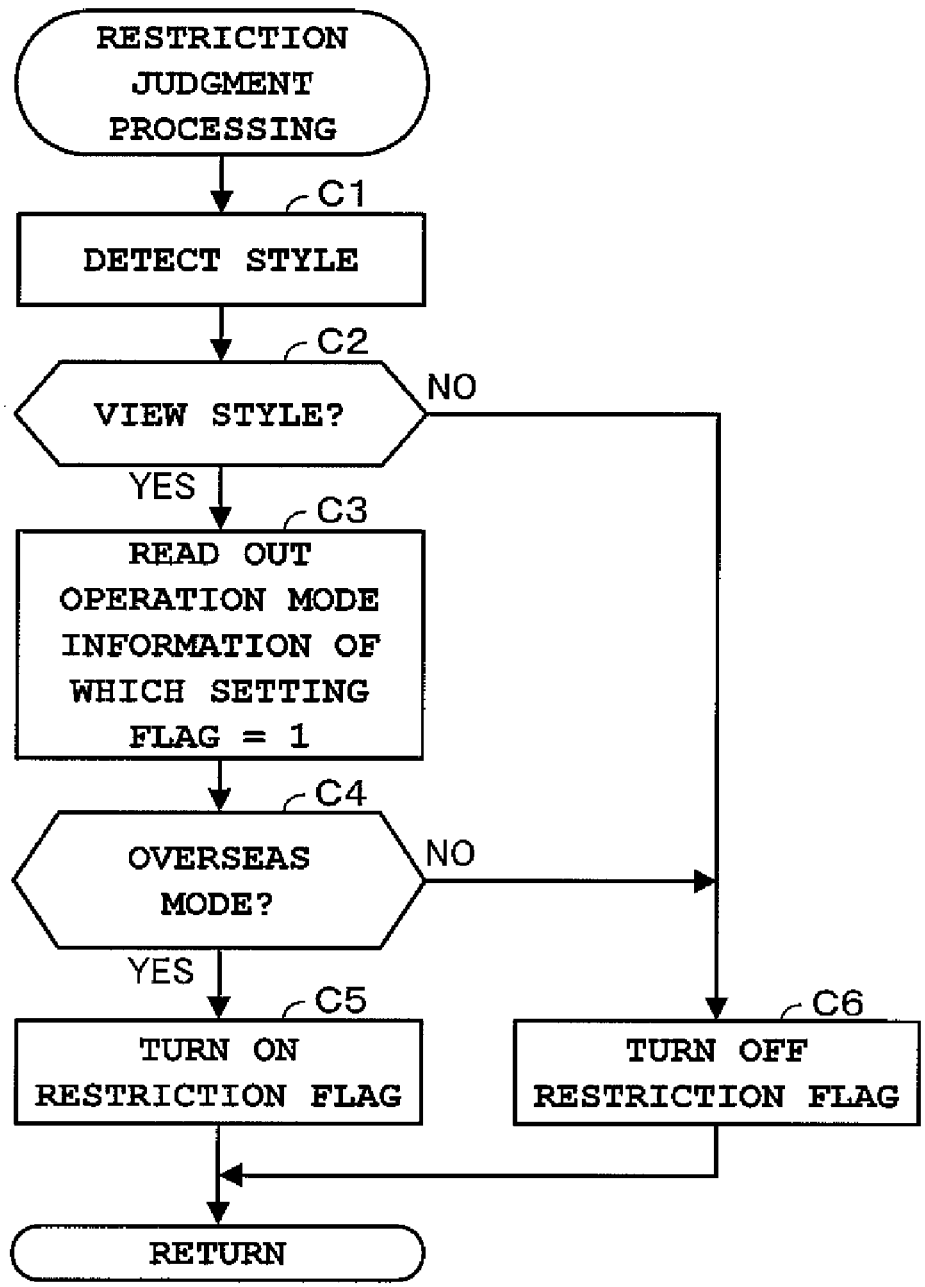
FIG. 7 is a flowchart showing details of restriction judgment processing (Step B7 in FIG. 6, etc.)

FIG. 7 is a flowchart showing details of the restriction judgment processing (Step B7 in FIG. 6, etc.).

In FIG. 7, firstly, the central control section 11 acquires the current style from the style detecting section 24 (Step C1). Then, the central control section 11 judges whether or not the current style is the view style (Step C2). When judged that the style is a style other than the view style (NO at Step C2), the central control section 11 turns off the restriction flag (not shown) in the various information temporary storage section M2 so that the call is not restricted (Step C6). When judged that the style is the view style (YES at Step C2), the central control section 11 accesses the operation mode information storage section M5 and reads out operation mode information of which the "setting flag" is "1" (Step C3). Then, the central control section 11 judges whether or not this operation mode information is "overseas mode" (Step C4). When judged that the operation mode information is not "overseas mode" (NO at Step C4), the central control section 11 turns off the restriction flag (Step C6). When judged that the operation mode information is "overseas mode" (YES at Step C4), the central control section 11 turns on the restriction flag (Step C5).

When such restriction judgment processing (Step B7 in FIG. 6) is completed, the central control section 11 judges whether or not the restriction flag has been turned on by the restriction judgment processing (Step B8). When judged that the restriction flag has been turned off (NO at Step B8), the central control section 11 exits the process flow in FIG. 6 to prevent the restriction of the call. When judged that the restriction flag has been turned on (YES at Step B8), the central control section 11 controls, as processing for restricting a call, the display section 17 to display a message indicating that the call is restricted due to the current style (Step B9) and a message prompting the change of the style (Step B10), and then returns to Step B2 to restrict the call.

In the above state where the call is being restricted, when the speaker-phone call connecting operation is performed (NO at Step B3), when the call connecting operation is performed after the hands-free kit 6 or the earphone microphone 7 is connected (YES at Step B2, and NO at Step B6), or when the call connecting operation is performed after the style is changed to a style other than the view style (YES at Step B2, No at Step C2 in FIG. 7, and NO at Step B8), the central control section 11 proceeds to Step B4 to release the restriction on the call. In this case, the restriction flag is turned on (YES at Step B4), and therefore the central control section 11 turns off the restriction flag (Step B5). The process flow in FIG. 6 is completed here, and the central control section 11 proceeds to subsequent call connection processing (Step A7 in FIG. 5).

Figure 8:
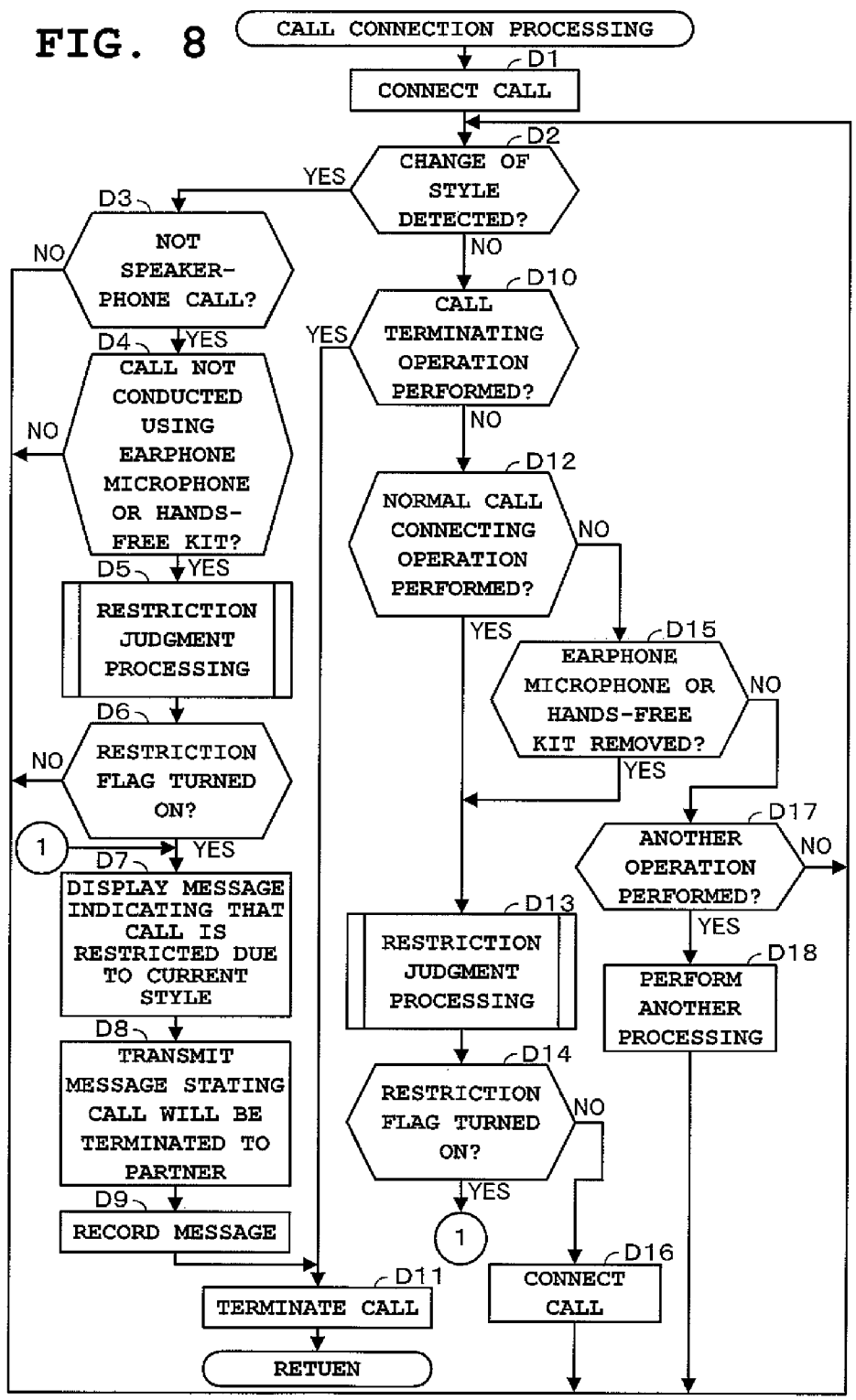
FIG. 8 is a flowchart showing details of call connection processing (Step A7 in FIG. 5)

FIG. 8 is a flowchart showing details of the call connection processing (Step A7 in FIG. 5).

In FIG. 8, firstly, the central control section 11 drives the reception speaker SP and the transmission microphone MC to achieve a call-connected state where a communication with a call partner is possible. In a case where an external audio output device such as the hands-free kit 6 or the earphone microphone 7 has been connected, instead of driving the reception speaker SP and the transmission microphone MC, the central control section 11 conducts the call using a reception speaker, earphone, and microphone included in the external audio output device. In the call reception processing described above and the call origination processing described hereafter, when the speaker-phone call connecting operation is performed, the central control section 11 performs a speaker-phone call (Step D1). The central control section 11 then acquires the current style from the style detecting section 24, and judges whether or not the style has been changed (Step D2). In addition, the central control section 11 judges whether or not another operation has been performed (Step D10, Step D12, and Step D17), and whether or not the hands-free kit 6 or the earphone microphone 7 has been removed (Step D15).

Here, when the style is changed (YES at Step D2), for example, when the open style is changed to the view style or the view style is changed to the open style during the call, the central control section 11 judges whether or not a speaker-phone call is in progress (Step D3). When judged that a speaker-phone call is not in progress, the central control section 11 judges whether or not the call is being conducted using an external audio output device such as the hands-free kit 6 or the earphone microphone 7 (Step D4). When judged that a speaker-phone call is in progress (NO at Step D3) or that the call is being conducted using an external audio output device such as the hands-free kit 6 or the earphone microphone 7 (NO at Step D4), the central control section 11 returns to Step D2 to perform control to prevent restriction of the call regardless of the current style.

When judged that a speaker-phone call is not in progress (YES at Step D3) and the call is not being conducted using an external audio output device (YES at Step D4), the central control section 11 proceeds to restriction judgment processing similar to that described above (Step D5). In this case, when the changed style is the view style (YES at Step C2 in FIG. 7) and the operation mode of which the "setting flag" is "1" is "overseas mode" (YES at Step C4 in FIG. 7), the central control section 11 turns on the restriction flag (Step C5 in FIG. 7). When the style is not the view style, or when the style is the view style but the operation mode is not "overseas mode", the central control section 11 turns off the restriction flag based on this condition (Step C6 in FIG. 7).

When such restriction judgment processing (Step D5 in FIG. 8) is completed, the central control section 11 judges whether or not the restriction flag has been turned on by the restriction judgment processing (Step D6). When judged that the restriction flag has been turned off (NO at Step D6), the central control section 11 returns to Step D2 to prevent the restriction of the call. When judged that the restriction flag has been turned on (YES at Step D6), the central control section 11 controls the display section 17 to display a message indicating that the call is restricted due to the current style (Step D7), and transmits an audio message stating that the call will be terminated to the call partner (Step D8). When a message from the partner side is received as a result, the central control section 11 records the message in the message storage section M4 (Step D9), and after performing call termination processing (Step D11), exits the process flow in FIG. 8.

On the other hand, when a call terminating operation is performed during the call (Step D10), the central control section 11 performs the call termination processing (Step D11), and exits the process flow in FIG. 8. When a normal call connecting operation is performed to switch from the speaker-phone call connection to a normal call connection (YES at Step D12), or when the hands-free kit 6 or the earphone microphone 7 is removed during the call (YES at Step D15), the central control section 11 proceeds to the above-described restriction judgment processing (Step D13), and turns on the restriction flag on the condition that the style is the view style and the operation mode is "overseas mode" (Step C2 to Step C5 in FIG. 7).

Here, when the restriction flag is turned off (NO at Step D14), the central control section 11 switches the speaker-phone call connection or the call conducted using the hands-free kit 6 or the earphone microphone 7 to a normal call connection (Step D16), and returns to Step D2. When the restriction flag is turned on (YES at Step D14), the central control section 11 subsequently proceeds to processing for restricting a call (Step D7 to Step D9). When another operation such as an operation for changing the sound volume of the call is performed (YES at Step D17), the central control section 11 performs another processing such as volume adjustment processing (Step D18).

Figure 9:
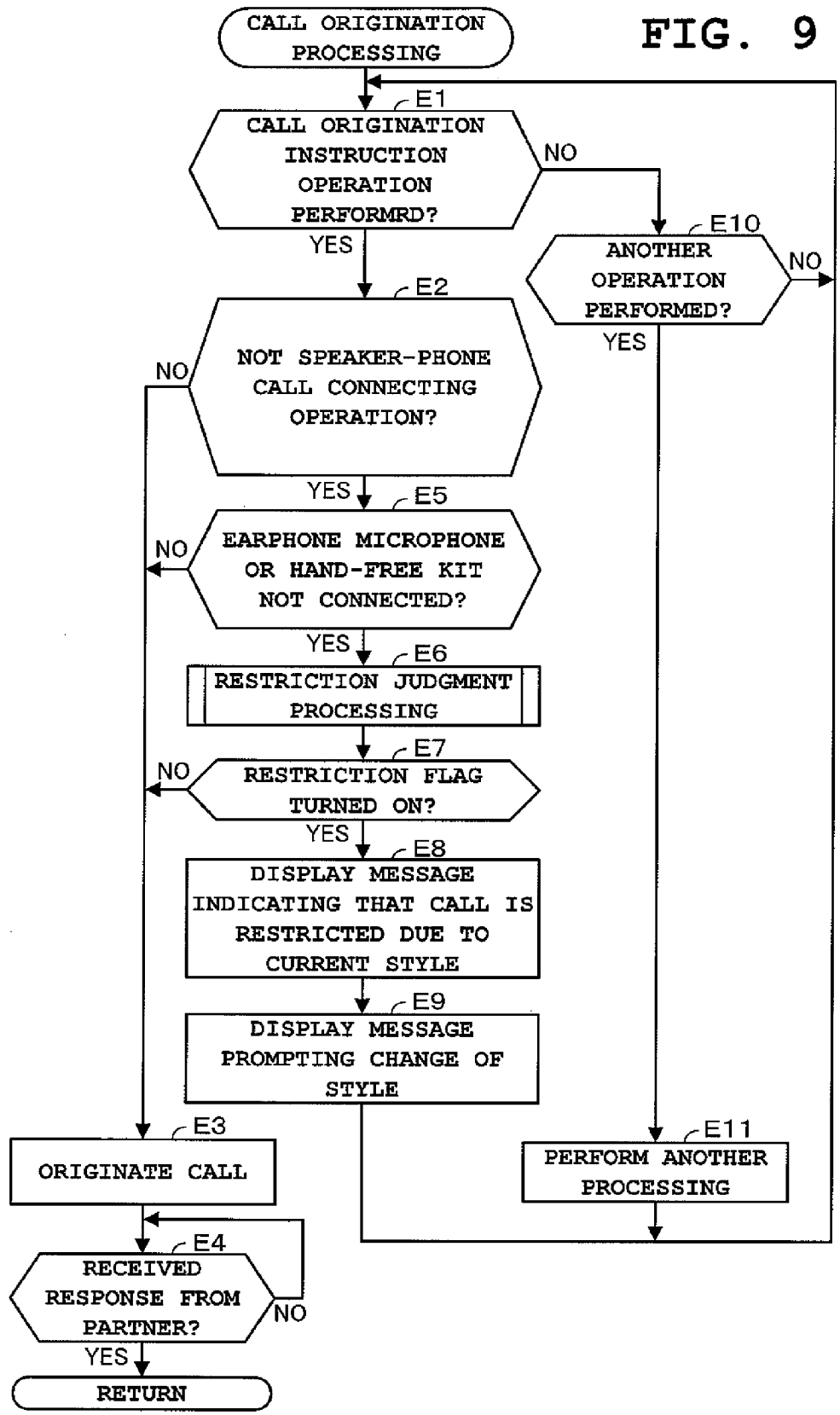
FIG. 9 is a flowchart showing details of call origination processing (Step A9 in FIG. 5)

FIG. 9 is a flowchart showing details of the call origination processing (Step S9 in FIG. 5).

In FIG. 9, firstly, the central control section 11 judges whether or not a call origination instructing operation for connecting a line has been performed (Step E1), and then judges whether or not another operation has been performed (Step E10). When judged that another operation such as an operation for changing a call partner has been performed (YES at Step E10), the central control section 11 performs processing corresponding to this operation such as, for example, call partner change processing (Step E11). When judged that the call origination instructing operation has been performed (YES at Step E1), the central control section 11 judges whether or not the call origination instructing operation is the speaker-phone call connecting operation (Step E2). When judged that the call origination instructing operation is the speaker-phone call connecting operation (NO at Step E2), because the user is considered to communicate with the call partner with the reception speaker SP being placed away from his ear, the central control section 11 proceeds to Step E3 to control not to restrict the call regardless of the current style, and after performing the call origination processing, enters a partner response waiting state (Step E4).

When the hands-free kit 6 or the earphone microphone 7 serving as an external audio output device has been connected (NO at Step E5), because the user is considered to communicate with the call partner using the external audio output device and unlikely to place the reception speaker SP near his ear, the central control section 11 proceeds to Step E3 to control not to restrict the call regardless of the current style, and after performing the call origination processing, enters the partner response waiting state (Step E4).

Here, in a case where the speaker-phone call connecting operation has not been performed and the external audio output device has not been connected (YES at Step E5), the central control section 11 proceeds to the above-described restriction judgment processing (Step E6), and turns on the restriction flag on the condition that the style is the view style and the operation mode is "overseas mode" (Step C2 to Step C5 in FIG. 7). In this restriction judgment processing, when the restriction flag is turned off (NO at Step E7), the central control section 11 performs the call origination processing (Step E3) and enters the partner response waiting state (Step E4). When the restriction flag is turned on (YES at Step E7), the central control section 11 controls, as processing for restricting a call, the display section 17 to display a message indicating that the call is restricted due to the current style (Step E8) and a message prompting the change of the style (Step E9), and then returns to Step E1 to restrict the call.

As described above, according to the first embodiment, when conducting a call in response to the origination or reception of a call by the wireless communication section 14, the central control section 11 restricts the call based on a detection result from the style detection sensor 24 and a restriction judgment result of whether or not the call should be restricted. Therefore, whether or not to restrict a call in a certain style is appropriately controlled, and advantageous practical effects are achieved. For example, the user need not be concerned about the style during a call, thereby significantly reducing the load on the user. In addition, companies manufacturing and selling mobile phones are not required to take action based on details of the regulations implemented in the sales regions.

Furthermore, the following effects are also achieved.

In the present invention, since a notification stating that a call in a certain style is restricted and a notification prompting the change of the current style are provided, the user is able to know that calls in the current style will be restricted and that it is possible to make calls by changing the style.

Additionally, in the present invention, the manner of notifying the restriction of a call is different from that of signaling an incoming call in that the notification regarding the restriction of a call is provided by a displayed message. Therefore, the user is able to differentiate the notification regarding the restriction of a call from a normal incoming call notification, and easily recognize that calls in the current style will be restricted.

Moreover, when the style is changed while a call is being restricted, the restriction on the call is released based on the new style (a style after the change). Therefore, in the present invention, it is possible to conduct calls when the style is changed to a correct style for conducting calls.

Furthermore, in the present invention, calls are not restricted when an external audio output device (such as the hands-free kit 6 or the earphone microphone 7) is connected. Therefore, calls using an external audio output device are possible regardless of whether or not calls in a certain style are being restricted.

Still further, in the case of speaker-phone calls, calls are not restricted. Therefore, speaker-phone calls are possible regardless of whether or not calls in a certain style are being restricted.

Yet still further, in the present invention, whether or not calls in a certain style should be restricted is judged based on an operation mode associated with a region where the mobile phone 1 is used. Therefore, whether or not calls in a certain style should be restricted in the region is easily and appropriately controlled.

Second Embodiment

Next, a second embodiment of the present invention will be described with reference to FIG. 10 and FIG. 11.

According to the above-described first embodiment, calls are restricted based on the style detected by the style detecting section 24. However, according to the second embodiment, calls are restricted based on the distance between the antenna AT and the reception speaker SP which changes depending on the style. Here, components in both embodiments that are basically the same or are given the same name have the same reference numbers, and explanations thereof are omitted. Hereinafter, characterizing portions of the second embodiment will mainly be described.

A block diagram showing the basic components of the mobile phone 1 according to the second embodiment differs from that according to the first embodiment in that an antenna and reception speaker distance detecting section 24A described hereafter is included. The antenna and reception speaker distance detecting section 24A will be described with reference to FIG. 2.

The style detecting section 24 according to the second embodiment includes the antenna and reception speaker distance detecting section 24A (a distance detecting section) in FIG. 2. The antenna and reception speaker distance detecting section 24A detects the distance between the antenna AT and the reception speaker SP which changes depending on the style. For example, a magnet and a magnetic sensor may be arranged near the antenna AT and the reception speaker SP, and the distance between the antenna AT and the reception speaker SP may be detected based on a detection result from the magnetic sensor. Note that the overall operation of the mobile phone 1 according to the second embodiment is similar to that shown in the flowchart in FIG. 5, and therefore explanations thereof are omitted.

Figure 10:
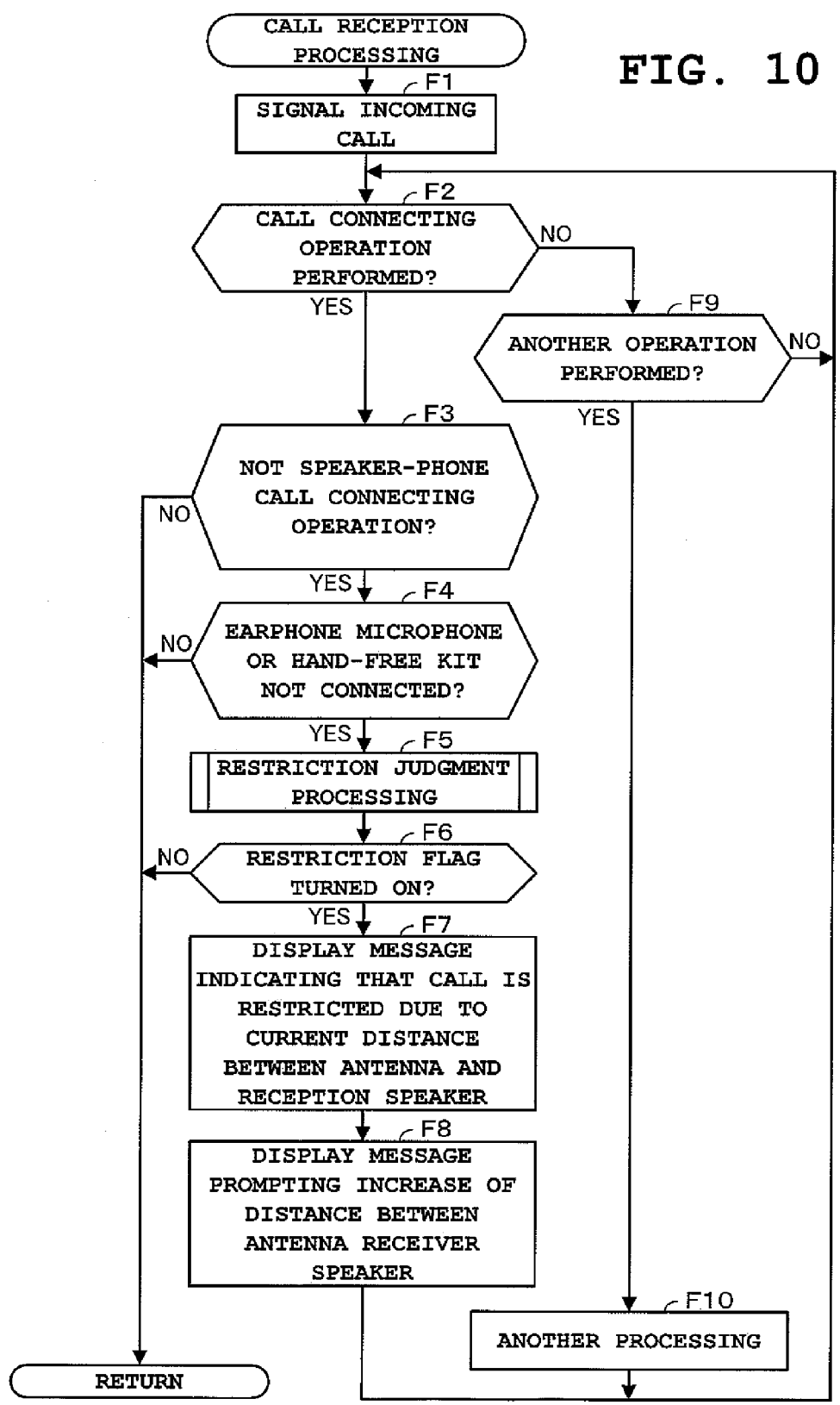
FIG. 10 is a flowchart showing details of call reception processing (Step A6 in FIG. 5) according to a second embodiment.

FIG. 10 is a flowchart showing details of call reception processing (Step A6 in FIG. 5) in the second embodiment.

In FIG. 10, firstly, in a manner similar to that according to the above-described first embodiment, the central control section 11 signals an incoming call (Step F1). The central control section 11 then judges whether or not the call connecting operation (off-hook operation) has been performed (Step F2) and subsequently judges whether or not another operation has been performed (Step F9). Here, when judged that another operation has been performed (YES at Step F9), the central control section 11 performs processing corresponding to this operation such as, for example, incoming call volume change processing (Step F10), and returns to Step F2.

When judged that the call connecting operation has been performed (YES at Step F2), and further judged that the call connecting operation is the speaker-phone call connecting operation that instructs the output of audio from a call partner at a loud volume (NO at Step F3) or that the hands-free kit 6 or the earphone microphone 7 serving as an external audio output device has been connected (NO at Step F4), the central control section 11 exits the process flow in FIG. 10 at this point to control not to restrict the call regardless of the current style. When judged that the call connecting operation is not the speaker-phone call connecting operation and further judged that the external audio output device has not been connected (YES at Step F4), the central control section 11 proceeds to restriction judgment processing (Step F5).

Figure 11:
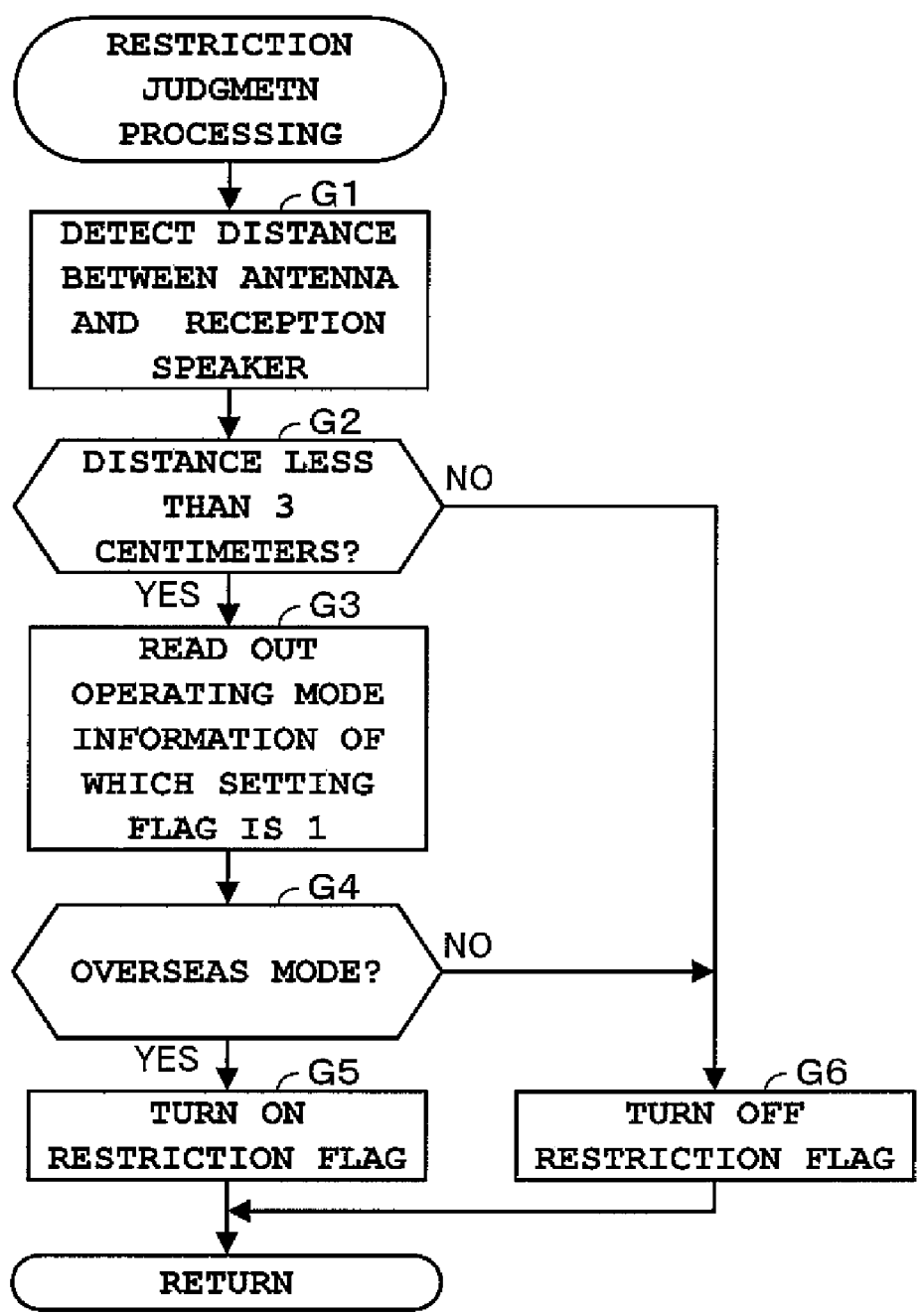
FIG. 11 is a flowchart showing details of restriction judgment processing (Step F5 in FIG. 6) according to the second embodiment.

FIG. 11 is a flowchart showing details of the restriction judgment processing (Step F5 in FIG. 6) in the second embodiment.

In FIG. 11, firstly, the central control section 11 acquires the distance between the antenna AT and the reception speaker SP as a detection result from the style detecting section 24 (Step G1), and determines the proximity of the antenna AT to the reception speaker SP by judging whether or not the distance is less than a predetermined value (such as 3 centimeters) (Step G2).

When judged that the distance is more than or equal to the predetermined value (NO at Step G2), the central control section 11 turns off the restriction flag so that the call is not restricted (Step G6). When judged that the distance is less than the predetermined value (YES at Step G2), the central control section 11 accesses the operation mode information storage section M5 and reads out operation mode information of which the "setting flag" is "1" (Step G3). Then, the central control section 11 judges whether or not the operation mode information is "overseas mode" (Step G4). When judged that the operation mode information is not "overseas mode" (NO at Step G4), the central control section 11 turns off the restriction flag. When judged that the operation mode information is "overseas mode" (YES at Step G4), the central control section 11 turns on the restriction flag (Step G5).

When such restriction judgment processing (Step F1 in FIG. 10) is completed, the central control section 11 judges whether or not the restriction flag has been turned on by the restriction judgment processing (Step F6). When judged that the restriction flag has been turned off (NO at Step F6), the central control section 11 exits the process flow shown in FIG. 10 at this point to control not to restrict the call. When judged that the restriction flag has been turned on (YES at Step F6), the central control section 11 controls, as processing for restricting a call, the display section 17 to display a message stating that the call will be restricted due to the current distance between the antenna AT and the reception speaker SP (Step F7). Then, after controlling the display section 17 to display a message prompting the increase of the distance between the antenna AT and the reception speaker SP (Step F8), the central control section 11 returns to Step F2 to restrict the call.

Note that call connection processing and call origination processing in the second embodiment are basically similar to those in the first embodiment described above. Therefore detailed explanations thereof are omitted, and only the differences therebetween are described below. In the second embodiment, "CHANGE OF STYLE DETECTED?" at Step D2 in the call connection processing in FIG. 8 is replaced by "CHANGE OF DISTANCE BETWEEN ANTENNA AND RECEPTION SPEAKER DETECTED?", and "DISPLAY MESSAGE INDICATING THAT CALL IS RESTRICTED DUE TO CURRENT STYLE" at Step D7 is replaced by "DISPLAY MESSAGE INDICATING THAT CALL IS RESTRICTED DUE TO CURRENT DISTANCE BETWEEN ANTENNA AND RECEPTION SPEAKER". Similarly, "DISPLAY MESSAGE INDICATING THAT CALL IS RESTRICTED DUE TO CURRENT STYLE" at Step E8 in the call origination processing in FIG. 9 is replaced by "DISPLAY MESSAGE INDICATING THAT CALL IS RESTRICTED DUE TO CURRENT DISTANCE BETWEEN ANTENNA AND RECEPTION SPEAKER", and "DISPLAY MESSAGE PROMPTING CHANGE OF STYLE" at Step E9 is replaced by "DISPLAY MESSAGE PROMPTING INCREASE OF DISTANCE BETWEEN ANTENNA AND RECEPTION SPEAKER".

As described above, according to the second embodiment, the distance between the antenna AT and the reception speaker SP which changes depending on the style is detected for the restriction of calls. Therefore, whether or not calls should be restricted is controlled with high accuracy based on the distance between the antenna AT and the reception speaker SP. Additionally, in the second embodiment as well, the manner of notifying the restriction of a call is different from that of signaling an incoming call in that the notification regarding the restriction of a call is provided by a displayed message. Therefore, the user is able to differentiate the notification regarding the restriction of a call from a normal incoming call notification, and easily recognize that calls will be restricted unless the current distance between the antenna AT and the reception speaker SP is changed.

Third Embodiment

Next, the third embodiment of the present invention will be described with reference to FIG. 12 to FIG. 17.

In the first embodiment, the judgment on whether or not calls in a certain style should be restricted is made based on an operation mode associated with a region where the mobile phone 1 is used. However, in the third embodiment, it is possible to make this judgment on whether or not calls in a certain style should be restricted based on the operation mode, location information, or region identifying information for identifying regions. Additionally, in the first embodiment, the restriction judgment processing is performed after an incoming call is detected and the call connecting operation is performed. However, in the third embodiment, the restriction judgment processing is performed, after the incoming call is detected, before the call connecting operation is performed. Moreover, in the third embodiment, a message from a call partner is recorded after a predetermined time has passed since control for restricting the call is performed. Here, components in the first and third embodiments that are basically the same or are given the same name have the same reference numbers, and explanations thereof are omitted. Hereinafter, characterizing portions of the third embodiment will mainly be described below. Note that the central control section 11 according to the third embodiment differs from that according to the first embodiment in that the central control section 11 according to the third embodiment actualizes a function of a message recording and playback means. According to the third embodiment, the central control section 11 and the wireless communication section 14 actualize a function of a reception means, and the central control section 11 and the storage section 13 actualize a message recording and playback means.

Figure 12:
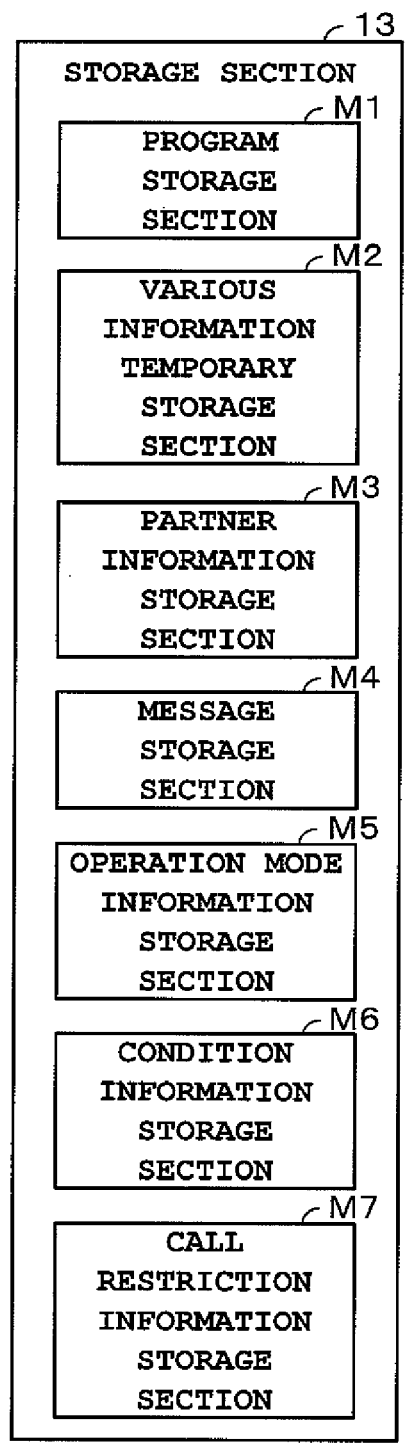
FIG. 12 is a diagram explaining contents of a storage section 13 according to a third embodiment.

FIG. 12 is a diagram explaining contents of the storage section 13 according to the third embodiment.

In FIG. 12, the storage section 13 according to the third embodiment includes a condition information storage section M6 and a call restriction information storage section M7 in addition to the program storage section M1, the various information temporary storage section M2, the partner information storage section M3, the message storage section M4, and the operation mode information storage section M5 which are also included in the storage section 13 according to the first embodiment.

Figure 13:
FIG. 13 is a diagram explaining a condition information storage section M6 according to the third embodiment.

FIG. 13 is a diagram explaining the condition information storage section M6 according to the third embodiment.

In FIG. 13, the condition information storage section M6 stores therein information (condition information) indicating which condition, among "operation mode", "country/region identifying information", and "location information", is used to make a judgment when judging whether or not calls in a certain style should be restricted. A "condition information ID" field, a "condition name" field, and a "setting flag" field are included in this condition information storage section M6. The "condition information ID" is, for example, a serial number identifying the condition information, and the "condition name" is a name used to identify the condition information. The "setting flag" indicates currently enabled condition information selectively set by user operation. When a value set in the "setting flag" is "1", the condition information is currently enabled.

FIG. 14 is a diagram explaining the call restriction information storage section M7 according to the third embodiment.

In FIG. 14, the call restriction information storage section M7 stores therein information for restricting calls under specific conditions for each style. A "style ID" field, a "style" field, an "operation mode" field, a "country/region identifying information" field, and a "location information" field are included in this call restriction information storage section M7. The "style ID" is, for example, a serial number identifying a corresponding style, and the "operation mode" is, as in the case of the above-described first embodiment, a name given to an operation mode such as "Japan mode" or "overseas mode". The "country/region identifying information" is, for example, a country code or an area code, and the "location information" is, for example, geographic coordinates indicating the location of a country or area. In the close style or the view style, for example, calls are restricted when the operation mode is "overseas mode", or the location information is ****. In the open style, calls are not restricted regardless of the "operation mode", the "country/region identifying information", and the "location information".

Figure 15:
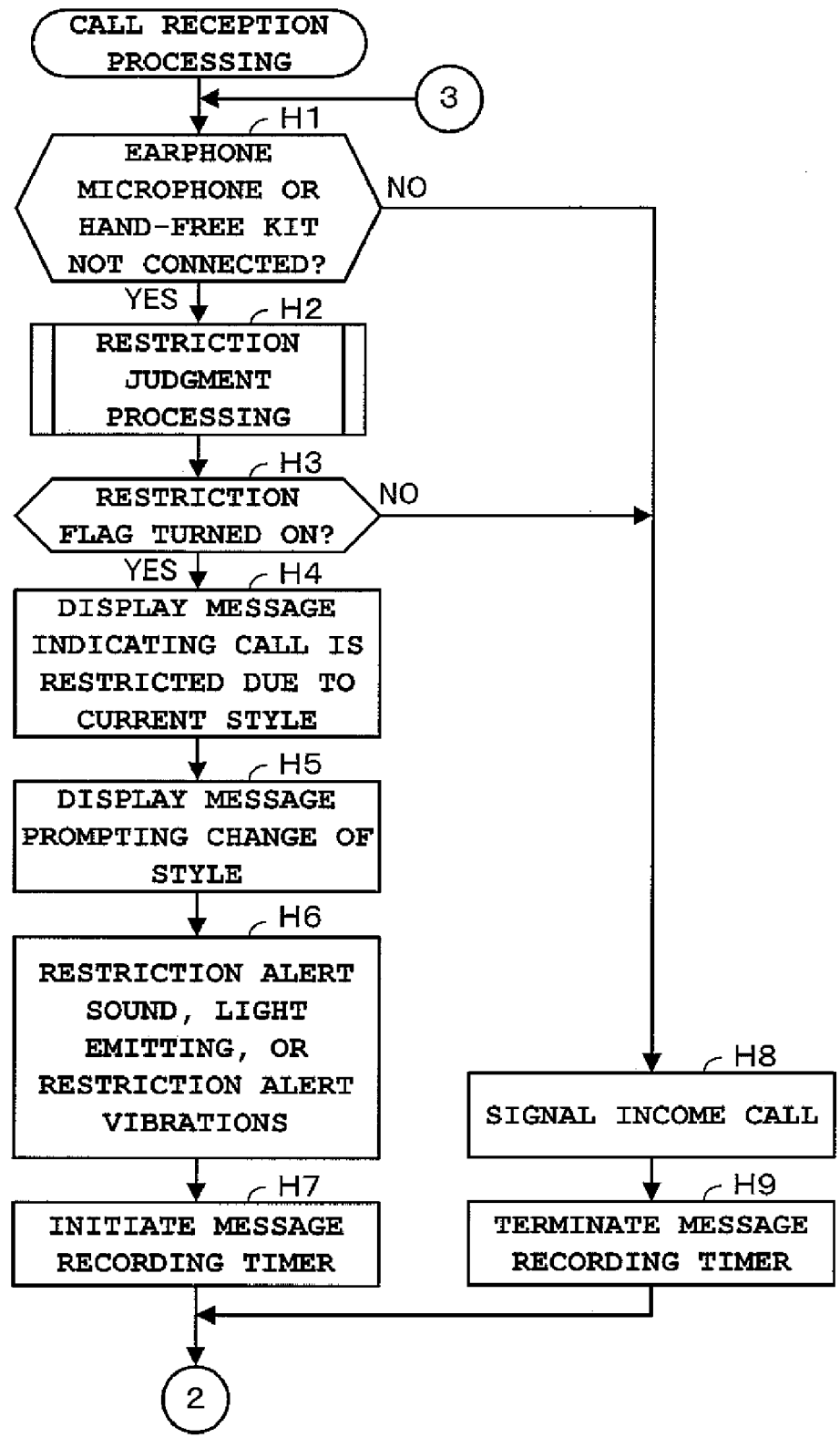
FIG. 15 is a flowchart showing details of call reception processing (Step A6 in FIG. 5) according to the third embodiment.
Figure 16:
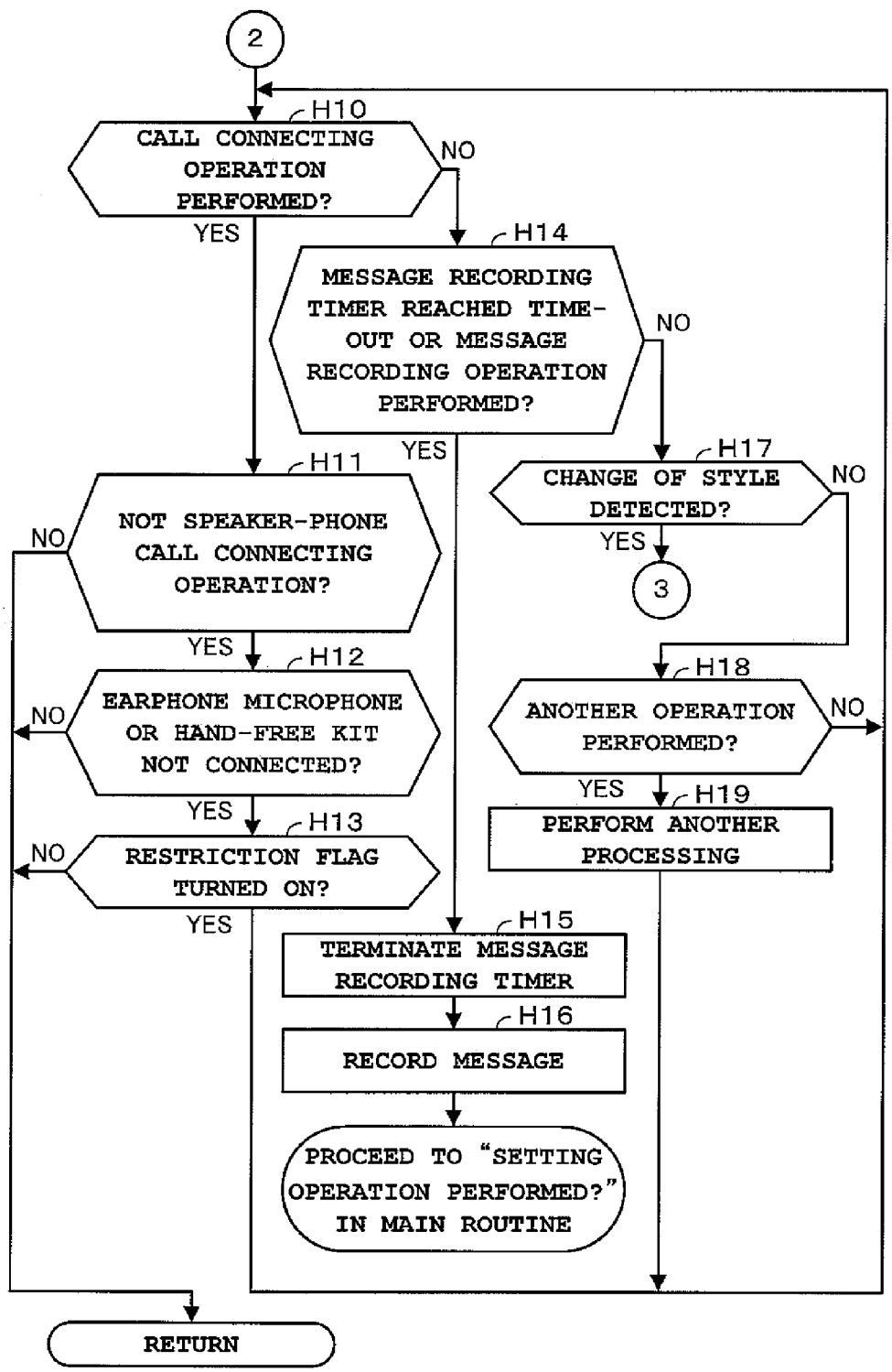
FIG. 16 is a flowchart showing operations following those in FIG. 15.

FIG. 15 and FIG. 16 are flowcharts showing details of call reception processing (Step A6 in FIG. 5) according to the third embodiment. Note that the overall operation of the mobile phone 1 according to the third embodiment is similar to that shown in the flowchart in FIG. 5, and therefore explanations thereof are omitted.

In FIG. 15, firstly, the central control section 11 judges whether or not the hands-free kit 6 or the earphone microphone 7 serving as an external audio output device has been connected (Step H1). When judged that the external audio output device has been connected (NO at Step H1), because this is a case where a call is conducted using an external audio output device, the central control section 11 proceeds to Step H8 to control not to restrict the call regardless of the current style. Then, the central control section 11 performs control for signaling the incoming call. Here, in the case where a normal incoming call notification such as an incoming call notification by sound is set to be performed, the incoming call is signaled by a set melody sound and the like at a set volume, and in the case where a incoming call notification by vibrations is set to be performed, the incoming call is signaled by set vibrations.

Subsequently, after terminating a message recording timer (not shown) in the various information temporary storage section M2 (Step H9), the central control section 11 proceeds to the processing in the flowchart in FIG. 16. Note that the message recording timer is a timer used to perform automatic recording of a message from a call partner after a predetermined time (such as five seconds) has passed since the call is restricted. When judged that the external audio output device has been connected, the central control section 11 keeps the message recording timer in a terminated state not to restrict the call. On the other hand, when judged that the external audio output device has not been connected (YES at Step H1), the central control section 11 proceeds to restriction judgment processing (Step H2).

Figure 17:
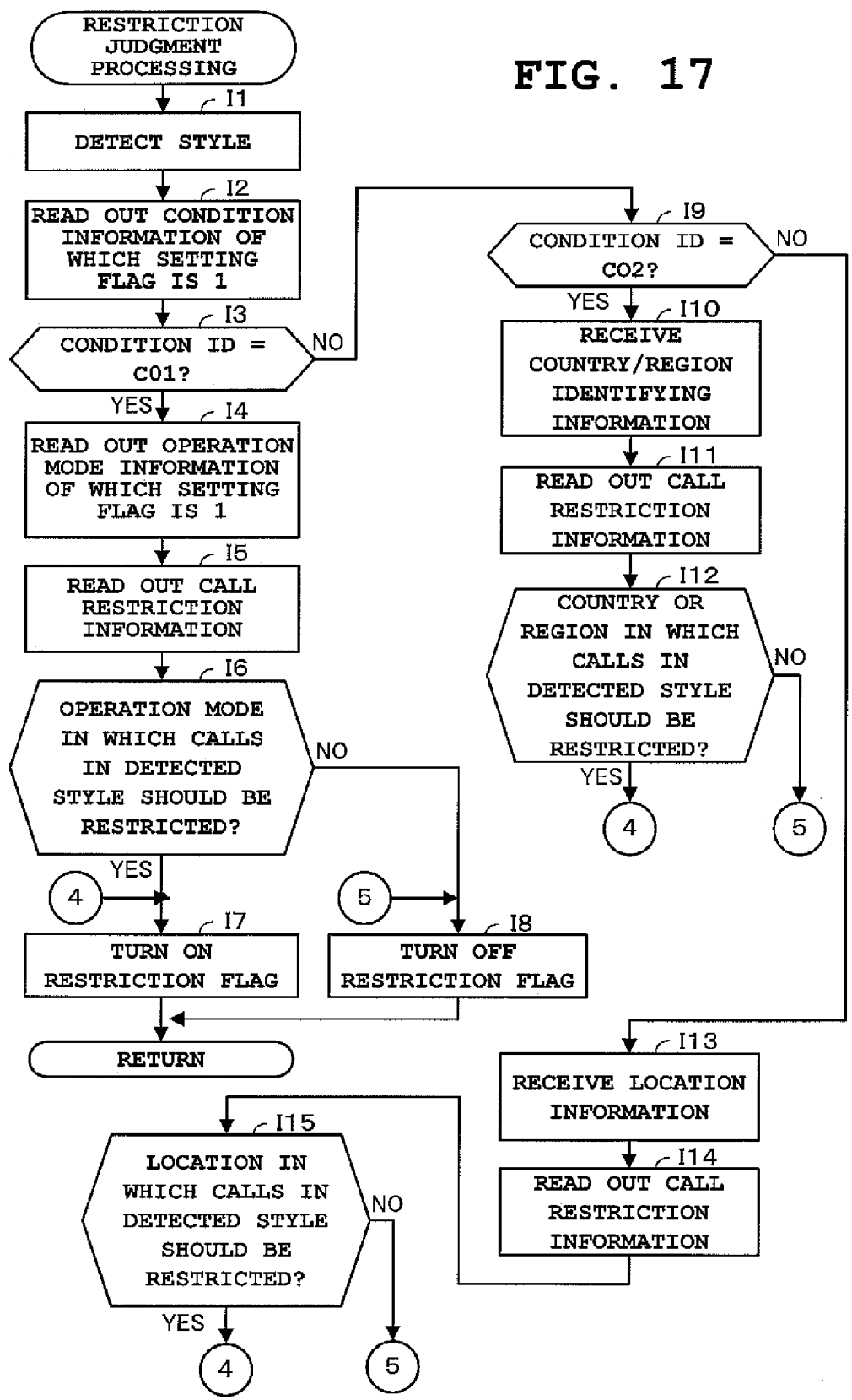
FIG. 17 is a flowchart showing details of restriction judgment processing (Step H2 in FIG. 6) according to the third embodiment.

FIG. 17 is a flowchart showing details of the restriction judgment processing (Step H2 in FIG. 15).

In FIG. 17, firstly, the central control section 11 acquires a style detection result from the style detecting section 24 (Step I1), and then accesses the condition information storage section M6 to read out condition information of which the "setting flag" is "1" (Step I2). Subsequently, the central control section 11 judges whether the "condition ID" is "C01" (Step I3), or "C02" or "C03" (Step I9).

Here, when judged that the "condition ID" is "C01" (YES at Step I3), the central control section 11 accesses the operation mode information storage section M5 to read out operation mode information of which the "setting flag" is set to "1" (Step I4). In addition, the central control section 11 accesses the call restriction information storage section M7 to read out relevant call restriction information based on the operation mode information and the detected style (Step I5), and judges whether or not the "operation mode" is an operation mode in which calls should be restricted (Step I6). For example, in the close style and the view style, the operation mode is judged to be an operation mode in which calls should be restricted when the operation mode is "overseas mode". When judged that the operation mode is "overseas mode" (YES at Step I6), the central control section 1 turns on the restriction flag (Step I7). When judged that the operation mode is not "overseas mode" (NO at Step I6), the central control section 11 turns off the restriction flag (Step I8).

When judged that the "condition ID" is "C02" (YES at Step I9), the central control section 11 receives country/region identifying information from the management device 3 via the wireless network 2 (Step I10). The central control section 11 then accesses the call restriction information storage section M7 to read out "country/region identifying information" as call restriction information based on the country/region identifying information and the detected style (Step I11), and judges whether or not the country/region is a country/region where calls should be restricted (Step I12). When judged that the country/region is a country/region where calls should be restricted (YES at Step I12), the central control section 11 turns on the restriction flag (Step I7). When judged that the country/region is not a country/region where calls should be restricted (NO at Step I12), the central control section 11 turns off the restriction flag (Step I8).

When judged that the "condition ID" is "C03" (NO at Step I9), the central control section 11 acquires current location information by receiving GPS information from the GPS satellite 5 and positional information from the base station 2A (Step I13). Subsequently, the central control section 11 accesses the call restriction information storage section M7 to read out call restriction information based on the current location information and the detected style (Step I14), and judges whether or not the location is a location where calls should be restricted (Step I15). When judged that the location is a location where calls should be restricted (YES at Step I15), the central control section 11 turns on the restriction flag (Step I7). When judged that the location is not a location where calls should be restricted (NO at Step I15), the central control section 11 turns off the restriction flag (Step I8).

When such restriction judgment processing (Step H2 in FIG. 15) is completed, the central control section 11 judges whether or not the restriction flag has been turned on by the restriction judgment processing (Step H3). When judged that the restriction flag has been turned off (NO at Step H3), calls are not restricted, and therefore the central control section 11 proceeds to Step H4 to perform a normal incoming call notification (Step H8). When judged that the restriction flag has been turned on (YES at Step H3), the central control section 11 controls the display section 17 to display a message indicating that the call is restricted due to the current style (Step H4) and a message prompting the change of the style (Step H5), and then gives a restriction notification using a notification manner differing from that for signaling an incoming call (Step H6).

For example, the central control section 11 may drive the sound speaker 21 to generate a restriction alert that differs from an incoming call alert, or drive the LED 22 to emit light differing from light emitted for signaling an incoming call. Also, the central control section 11 may drive the vibration motor 23 to generate vibrations that differ from vibrations for signaling an incoming call, or control the display section 17 to display different display content. Then, after giving a restriction notification, the central control section 11 initiates the above-described message recording timer to start a timer operation (Step H7), and proceeds to the processing in the flowchart in FIG. 16. In the case where the message recording timer is already running at Step H7, the central control section 11 continues the timer operation of the message recording timer.

After entering the process flow shown in FIG. 16, the central control section 11 judges whether or not the call connecting operation has been performed (Step H10). Also, the central control section 11 judges whether or not the message recording timer has reached time out or a message recording operation for instructing the recording of a message from the call partner has been performed (Step H14). Moreover, the central control section 11 judges whether or not the change of the style has been detected (Step H17). Furthermore, the central control section 11 judges whether or not another operation has been performed (Step H18). When judged that the call connecting operation has been performed (YES at Step H10) and further judged that the call connecting operation is the speaker-phone call connecting operation that instructs the output of audio from a call partner at a loud volume (NO at Step H11), the central control section 11 exits the process flow in FIG. 16 at this point to control not to restrict the call regardless of the current style.

When judged that the call connecting operation is not the speaker-phone call connecting operation (YES at Step H11), the central control section 11 judges whether or not the hands-free kit 6 or the earphone microphone 7 serving as an external audio output device has been connected (Step H12). When judged that the external audio output device has been connected (NO at Step H12), the central control section 11 exits the process flow in FIG. 16 at this point to control not to restrict the call. When judged that the call connecting operation is not the speaker-phone call connecting operation and further judged that the external audio output device has not been connected (YES at Step H12), the central control section 11 judges whether or not the restriction flag has been turned off (Step H13).

When judged that the restriction flag has been turned off (NO at Step H13), the central control section 11 exits the process flow in FIG. 16 at this point to control not to restrict the call. When judged that the restriction flag has been turned on (YES at Step H13), the central control section 11 returns to Step H6 to restrict the call. When judged that the message recording timer has reached time-out or the message recording operation has been performed (YES at Step H14), the central control section 11 stops the timer operation of the message recording timer (Step H15). The central control section 11 then receives a message from the call partner and records the message in the message storage section M4 (Step H16).

Subsequently, the central control section 11 skips the call connection processing (Step A7) in FIG. 5 and returns to Step A3.

On the other hand, when judged that the change of the style has been detected (YES at Step H17 in FIG. 16), the central control section 11 proceeds to Step H1 in FIG. 15 and subsequently repeats the processing described above. When judged that another operation such as the change of the sound volume has been performed (YES at Step H18), the central control section 11 proceeds to processing corresponding to the operation (Step H19).

When, in the process flow in FIG. 5, a playback operation for instructing playback to the message information storage section M4 is performed as another operation (YES at Step A12), the central control section 11 performs message playback processing to read out and output the content in the message storage section M4 (Step A13). When a setting operation is performed on the condition information storage section M6 (YES at Step A3), the central control section 11 performs setting processing for turning on and off the setting flag in the condition information storage section M6 (Step A4).

As described above, according to the third embodiment, it is possible to make the judgment on whether or not calls in a certain style should be restricted based on an operation mode associated with a region where the mobile phone 1 is used. Therefore, whether or not calls in a certain style should be restricted in the region where the mobile phone 1 is currently used is easily and appropriately controlled.

In addition, it is possible to make the judgment on whether or not calls in a certain style should be restricted based on region identifying information for identifying regions. Therefore, whether or not calls in a certain style should be restricted in the region where the mobile phone 1 is currently used is accurately controlled.

Moreover, it is possible to make the judgment on whether or not calls in a certain style should be restricted based on location information. Therefore, whether or not calls in a certain style should be restricted in the location where the mobile phone 1 is currently used is accurately controlled.

Furthermore, in the judgment on whether or not calls should be restricted, which to use for the judgment is arbitrarily selectable among an operation mode, region identifying information, and positional information. Therefore, the suitability for the user's needs is ensured.

Still further, the manner of notifying the restriction of a call (restriction alert, vibrations, light emitting, and display content) differs from that for signaling an incoming call. Therefore, the user is able to differentiate the notification regarding the restriction of a call from a normal incoming call notification, and easily recognize that calls in the current style will be restricted.

Yet still further, it is possible to record and play back a message from a call partner after a predetermined time has passed since the call is restricted. Therefore, the user is able to confirm a message from a call partner even while calls are being restricted.

Variation Example of the Present Invention

According to the above-described third embodiment, country/region identifying information is received from the management device 3 via the wireless network 2. However, this reception is not limited to that via the wireless network 2. Country/region identifying information may be received via an arbitrary communication network such as the Internet, a local area network, or a broadcast network.

Additionally, in each of the above-described embodiments, arrangement positions of the reception speaker SP and the antenna AT may be determined arbitrarily. That is, although the reception speaker SP is positioned on the opposite side of the hinge section C on the inner surface side of the display section housing B and the antenna AT is positioned on the opposite side of the hinge section C on the inner surface side of the operation section housing A, the arrangement positions of the receiving speaker SP and the antenna AT may be determined arbitrarily. Also, the antenna AT is not limited to a built-in antenna, and may be an antenna of arbitrary shape such as a telescopic antenna.

Moreover, the style in each of the above-described embodiments is not limited to the close style, the open style, and the view style. For example, when a communication terminal device is a sliding type where the operation section housing and the display housing are connected so as to be slidable, there can be optional styles corresponding to the structure of the housing, such as a position style which is not slidable (operation section housing and display housing overlapped position), a position style which is slidable and an intermediate position style of both positions. In addition, the communication terminal device may be a reversible type mobile phone, or a so-called two-way opening-type mobile phone that can be arranged in a normal opened position (vertically opened position) and in a horizontally opened position for a wide-screen effect.

Furthermore, the style may be determined based on the distance between the reception speaker SP and the antenna AT. In this case, the style is, for example, a style where the distance is 1 centimeter, a style where the distance is 3 centimeters, a style where the distance is 5 centimeters, etc. In addition, the style detecting section 24 is not limited to detecting the distance between the reception speaker SP and the antenna AT. The style detecting section 24 may detect the proximity of the reception speaker SP and the antenna AT, or the positional relationship between the reception speaker SP and the antenna AT. Moreover, the name of the style detecting section 24 is not limited thereto. The style detecting section 24 may be named a detecting section for detecting the proximity of the reception speaker SP and the antenna AT, or a detecting section for detecting the positional relationship between the reception speaker SP and the antenna AT.

Still further, in each of the above-described embodiments, location information is acquired by receiving GPS information from the GPS satellite 5, and receiving positional information from the base station 2A. However, location information may be acquired by an arbitrary method. Additionally, in the above-described embodiments, the hands-free kit 6 and the earphone microphone 7 are given as the external audio output device. However, arbitrary external audio output devices, such as an earphone or an in-vehicle kit, which allows communication performed instead of a normal voice call may be used.

Yet still further, the communication terminal device is not limited to a mobile phone. The communication terminal device may be any arbitrary communication terminal device providing a communication function, such as a personal computer, a personal digital assistant (PDA), a digital camera, or a music player providing a communication function.

While the present invention has been described with reference to the preferred embodiments, it is intended that the invention be not limited by any of the details of the description therein but includes all the embodiments which fall within the scope of the appended claims.

What is claimed is:

1. A communication terminal device having at least one housing with a structure that is changeable to a plurality of styles, comprising:
   a communication detection means for detecting communication that is at least one of either an incoming call or an originating call;
   a call connection means for connecting a call in response to communication detected by the communication detection means;
   a distance detection means for detecting a distance between a communication antenna and a reception speaker corresponding to a style change;
   a set means for setting an operation mode associated with a region where the communication terminal is being used;
   a restriction judgment means for judging whether or not a call in a certain style should be restricted based on the operation mode set by the set means and a detection result from the distance detection means;
   a control means for performing control such that a call connected in response to communication detected by the communication detection means is restricted based on a judgment result from the restriction judgment means; and
   a style detecting means for detecting a style based on the distance between the communication antenna and the reception speaker detected by the distance detection means.

2. The communication terminal device according to claim 1, further comprising:
   a restriction notification means for giving at least one of either a notification indicating that a call connected in response to communication detected by the communication detection means is restricted or a notification prompting change of the style detected by the style detecting means to another style.

3. The communication terminal device according to claim 2, further comprising:
   an incoming call notification means for giving a notification of an incoming call;
   wherein a notification by the restriction notification means and a notification by the incoming call notification means are given in different notification manners.

4. The communication terminal device according to claim 1, further comprising:
   a release means for, when a style detected by the style detection means is changed while a call is being restricted under control performed by the control means, releasing the restriction on the call based on a style after the change.

5. The communication terminal device according to claim 1, further comprising:
   a message recording and playback means for, after a predetermined time has passed since a call is restricted under control performed by the control means, recording a message from a call partner and allowing the message recorded to be played back.

6. The communication terminal device according to claim 1, further comprising:

a connection means for connecting an external audio output device;

wherein the control means performs control such that a call is not restricted when an external audio output device has been connected by the connection means.

7. The communication terminal device according to claim 1, further comprising:

a speaker-phone call connection means for performing a speaker-phone call in which audio from a call partner is outputted from a reception speaker at a loud volume;

wherein the control means performs control such that a call is not restricted in a case where the speaker-phone call connection means performs a speaker-phone call.

8. A communication terminal device having at least one housing with a structure that is changeable to a plurality of styles, comprising:

a communication detection means for detecting communication that is at least one of either an incoming call or an originating call;

a call connection means for connecting a call in response to communication detected by the communication detection means;

a distance detection means for detecting a distance between a communication antenna and a reception speaker corresponding to a style change;

an acquisition means for acquiring location information;

a restriction judgment means for judging whether or not a call should be restricted based on the location information acquired by the acquisition means and a detection result from the distance detection means;

a control means for performing control such that a call connected in response to a communication detected by the communication detection means is restricted based on a judgment result from the restriction judgment means; and a style detecting means for detecting a style based on the distance between the communication antenna and the reception speaker detected by the distance detection means.

9. The communication terminal device according to claim 1, further comprising:

a reception means for receiving region identifying information used to identify regions;

wherein the restriction judgment means judges whether or not a call should be restricted based on region identifying information received by the reception means.

10. A non-transitory computer-readable storage medium having stored thereon a program that is executable by a computer, comprising:

communication detection process for detecting communication that is at least one of either an incoming call or an originating call;

call connection process for connecting a call in response to detected communication;

a distance detection process for detecting a distance between a communication antenna and a reception speaker corresponding to a style change;

a set process for setting an operation mode associated with a region where a communication terminal is being used;

restriction judgment process for judging whether or not a call should be restricted based on the operation mode set by the set process and a detection result from the distance detection process;

control process for performing control such that a call connected in response to detected communication is restricted based on a restriction judgment result; and a style detecting process for detecting a style based on the distance between the communication antenna and the reception speaker detected by the distance detection process.

11. A non-transitory computer-readable storage medium having stored thereon a program that is executable by a computer, comprising:

communication detection process for detecting communication that is at least one of either an incoming call or an originating call;

call connection process for connecting a call in response to detected communication;

a distance detection process for detecting a distance between a communication antenna and a reception speaker corresponding to a style change;

an acquisition process for acquiring location information;

restriction judgment process for judging whether or not a call should be restricted based on the location information acquired by the acquisition process and a detection result from the distance detection process;

control process for performing control such that a call connected in response to communication detected by the communication detection process is restricted based on a judgment result from the restriction judgment process; and a style detecting process for detecting a style based on the distance between the communication antenna and the reception speaker detected by the distance detection process.

* * * * *